United States Patent
Schwaller et al.

(10) Patent No.: US 6,625,648 B1
(45) Date of Patent: Sep. 23, 2003

(54) METHODS, SYSTEMS AND COMPUTER PROGRAM PRODUCTS FOR NETWORK PERFORMANCE TESTING THROUGH ACTIVE ENDPOINT PAIR BASED TESTING AND PASSIVE APPLICATION MONITORING

(75) Inventors: Peter James Schwaller, Raleigh, NC (US); Joan Marie Bellinghausen, Cary, NC (US); Dana Scott Borger, Cary, NC (US); Jeffrey Todd Hicks, Cary, NC (US); Steven Thomas Joyce, Raleigh, NC (US); Mark Eric McCorry, Raleigh, NC (US); Christopher David Selvaggi, Cary, NC (US); Mark Clarence Zelek, Cary, NC (US)

(73) Assignee: NetIQ Corporation, Santa Clara, CA (US)

( * ) Notice: Subject to any disclaimer, the term of this patent is extended or adjusted under 35 U.S.C. 154(b) by 0 days.

(21) Appl. No.: 09/479,565

(22) Filed: Jan. 7, 2000

(51) Int. Cl.⁷ .................................. G06F 15/173
(52) U.S. Cl. ............... 709/224; 709/223; 709/228; 370/230; 370/466
(58) Field of Search ................. 709/201, 220, 709/221, 228, 224, 200, 223; 370/230, 231, 251, 351, 397, 466

(56) References Cited

U.S. PATENT DOCUMENTS

| | | | |
|---|---|---|---|
| 4,545,011 A | 10/1985 | Lyon et al. | |
| 5,049,873 A | 9/1991 | Robins et al. | |
| 5,107,450 A | 4/1992 | Lawrenz | |
| 5,257,393 A | 10/1993 | Miller | |
| 5,475,843 A | * 12/1995 | Halviatti et al. | 717/124 |
| 5,572,640 A | 11/1996 | Schettler | |
| 5,590,126 A | * 12/1996 | Mishra et al. | 370/329 |
| 5,634,009 A | 5/1997 | Iddon et al. | |
| 5,706,436 A | 1/1998 | Lewis et al. | |
| 5,732,213 A | 3/1998 | Gessel et al. | |
| 5,764,915 A | 6/1998 | Heimsoth et al. | |
| 5,809,286 A | 9/1998 | McLain, Jr. et al. | |
| 5,838,919 A | 11/1998 | Schwaller et al. | |
| 5,852,714 A | * 12/1998 | Tseng et al. | 713/201 |
| 5,881,237 A | 3/1999 | Schwaller et al. | |
| 5,937,165 A | 8/1999 | Schwaller et al. | |
| 5,959,974 A | * 9/1999 | Badt et al. | 370/233 |
| 6,061,725 A | * 5/2000 | Schwaller et al. | 709/224 |
| 6,233,249 B1 | * 5/2001 | Katseff et al. | 370/466 |
| 6,286,047 B1 | * 9/2001 | Ramanathan et al. | 709/224 |
| 6,392,993 B1 | * 5/2002 | Hamilton et al. | 370/230 |
| 6,397,359 B1 | * 5/2002 | Chandra et al. | 714/712 |
| 6,408,335 B1 | * 6/2002 | Schwaller et al. | 709/224 |
| 6,426,947 B1 | * 7/2002 | Banker et al. | 370/254 |
| 6,442,141 B1 | * 8/2002 | Borella et al. | 370/248 |

OTHER PUBLICATIONS

Butterfield, "System Performance Monitor/2 Reference," International Business Machines Corporation (1991).

(List continued on next page.)

Primary Examiner—Nabil El-Hady
(74) Attorney, Agent, or Firm—Myers Bigel Sibley & Sajovec

(57) ABSTRACT

Methods, systems and computer program products for testing the performance of a communication network including a plurality of endpoint nodes executing application programs which utilize the communications network are provided. A console node is provided on the network which may initiate operations by test agents executing on one or more of the plurality of endpoint nodes. The agents may generate network performance information using passive application monitoring and/or active endpoint pair based network testing responsive to scheduling instructions from the console node. Specific application programs may be designated for passive monitoring and active test protocols may be provided based on an expected type of application communication traffic. In another aspect of the present invention, one of a plurality of types of transaction models defining the beginning and ending reference point for a transaction timing measurement may be provided to the endpoint nodes for use in passive application monitoring. In a further aspect of the present invention, the endpoint nodes may be automatically discovered by the console node.

36 Claims, 11 Drawing Sheets

OTHER PUBLICATIONS

Brochure, "The DA–30® family of internetwork analyzers", Wandel & Goltermann (1994).

Brochure, "DA–30C benchmarking Capabilities", Wandel & Goltermann (1995).

Brochure, "Vital Signs VisionNet", BlueLine Software, Inc., including inserts "LAN Agent", "VTAM Agent", "NCPL Agent" (1995).

Brochure, Vital Signs VisionNet (1995).

Brochure, "SmartBits: Switch testing in its simplest form . . . ", Netcom Systems, Inc. (1995).

Brochure, "EconNet™: Networked Applications Performance Management", Compuware Corporation (1995).

Brochure, Hot off the Shelf: Application Management, Data Communications (Jan. 1996).

Brochure, "10 Reasons Why You Need an Applications View of Your Network," Compuware Corporation (Jan. 9, 1996).

Brochure, "Network General Corporation: Products and Services", Network General Corporation (1995).

Brochure, "ProView: Network Performance Management Systems", Network Telemetrics, Inc. (1995).

Brochure, "Managing the User Environment across Integrated SNA and IP Networks", Networks Telemetrics, Inc. (1995).

Brochure, "Using Performance Baselines to Manage Network Service Levels", Williamson, W., Network Telemetrics, Inc. (1995).

Brochure, "Standard Based Distributed Diagnostics for Enterprise Networks", Frontier Software Development, Inc. (Sep. 1995).

Brochure, "Quality Works—The most complete client/server testing solution you can buy", Segue Software Products (1996).

Brochure, "LANQuest: Net/WRx", LANQuest (Sep. 12, 1995).

Brochure, EcoNET: The View from the Top, Hurwitz Consulting Group, Inc. (1995).

Brochure, "Visual OnRamp™ Managed Internet Access Device" (1/96).

Brochure, "Optimal Application Expert™" Optical Networks Corp. (1997).

Article, Sobel, Ken; *"Compuware's EcoSCOPE"; Hurwitz Group, Inc.* (9/97).

*Characterizing End–to–End Performance: A VitalSigns Whitepaper*VitalSigns Software, Inc. 1998.

*Compuware EcoSystems Expands Application Performance Analysis Capabilities for Large EnterprisesComputware News Release*, Oct. 20, 1998.

Website Product Description of Patrol from BMC Software (12/98).

Brochure, "First Sense Agent" 1998.

VitalAgent from INS Brochure, 5/98.

Website Product Description of Luminate for SAP R/3 (12/98).

Website Product Description of Envive for SAP R/3 (12/98).

Brochure, "NetScout" 1997.

Brochure, "Sniffer" 1998.

Brochure, "NetMetrix from Hewlett Packard" 1995.

Application Expert from Optimal Networks Corp. Brochure, 1999.

Brochure, "EcoSCOPE" from Compuware Corp., 1998.

Brochure, "EcoSCOPE" from Compuware Corp., 1/99.

Visual Onramp from Visual Networks, Inc., 1/96.

VeriServ from Response Networks, Inc. Brochure, 11/97.

SLM from Jyra Research, Inc. Brochure, 1997.

VitalAnalysis from VitalSigns Software Brochure, 1/98.

VitalAnalysis from VitalSigns Software, Inc. Brochure, 6/96.

* cited by examiner

METHODS, SYSTEMS AND COMPUTER PROGRAM PRODUCTS FOR NETWORK PERFORMANCE TESTING THROUGH ACTIVE ENDPOINT PAIR BASED TESTING AND PASSIVE APPLICATION MONITORING

FIELD OF THE INVENTION

The present invention, generally, relates to network communication methods, systems and computer program products and, more particularly, to systems, methods and computer program products for performance testing of computer networks.

BACKGROUND OF THE INVENTION

Companies are often dependent on mission-critical network applications to stay productive and competitive. To achieve this, information technology (IT) organizations preferably provide reliable application performance on a 24-hour, 7-day-a-week basis. In this demanding environment, frequent network expansion and day-to-day fire fighting often leave little time for IT managers to manage network performance proactively. Accordingly, IT managers typically rely on some form of system management and/or network management tools to help automate performance management tasks to increase the efficiency of the IT staffs. Even with these tools, IT staffs are typically required to commit resources to integrating and customizing the tools to work in the heterogeneous network environments which may include, for example, hardware from a variety of vendors, executing a variety of operating systems and communication protocols and supporting a variety of application programs for different end user requirements.

Various known system management products track specific information, such as the CPU utilization on a server, server paging and disk access activity, or client application response time. This information may be useful when solving problems on a network. These products can generally be categorized as passive systems or application monitors. This category typically is implemented as software agent technologies that reside on the client or server computers. These agents generally passively monitor live application transactions and monitor resource utilization. Products in this category include Patrol from BMC Software, Inc., FirstSense Agent from FirstSense Software, Inc., VitalAgent from INS, Luminate Software Corp., and Envive Corp. As they are passive application monitors, they typically support specific application programs. For example, Luminate Software and Envive support the SAP R/3 application. Their measurements are generally neither consistent nor repeatable, as a user's interaction with a given application varies over time. Moreover, they are typically not suited to detecting system slowdowns or failures from the perspective of an end user. Operations for one such passive monitor are described in "Characterizing End-to-End Performance: A VitalSigns Whitepaper," VitalSigns Software, Inc. 1998.

Another approach to passive monitoring is directed to the network rather than the overall system. On the network side, element managers or passive network monitors are known which may address a specific segment or device on the network. Element managers are generally software designed to manage specific groups of devices, such as routers and switches. Passive network monitors are typically a combination of hardware and software that may, for example, monitor network traffic at the link layer or at the infrastructure devices. Products falling in this category include remote monitor (RMON) probes from NetScout Systems, Inc., Sniffer from Network Associates, NetMetrix from Hewlett-Packard, Application Expert from Optimal Networks Corp., EcoSCOPE from Compuware Corp., and Visual OnRamp from Visual Networks, Inc. These network management tools typically provide information such as packet loss, bit rates, and network utilization. This type of information may be helpful in fixing a network problem after the problem has been identified. However, as with the passive system monitors, these tools generally do not reflect network performance as experienced by a user. These tools are passive, in that they generally watch the network traffic which traverses a network segment or link, rather than actively creating traffic.

Passive network monitors sometimes include a basic scheduler to collect sample data from their data sources. A basic scheduler generally merely specifies the frequency (e.g., once every 15 minutes) at which the management console of the monitor should collect data from the data sources. Passive monitors are limited in that they are typically expensive to scale, and only see traffic that is on the network at the time.

Another category of system management tool is active application monitors. These are products that generally measure performance by actively emulating application transactions. These transactions are often referred to as "synthetic" transactions. Products in this category include Ganymede Software Inc.'s Chariot® and Pegasus™ products, as described in U.S. Pat. No. 5,838,919 issued Nov. 17, 1998, U.S. Pat. No. 5,881,237 issued Mar. 9, 1999 and U.S. Pat. No. 5,937,165 issued Aug. 10, 1999; VeriServ from Response Networks, Inc. and SLM from Jyra Research Inc. VeriServ allows an operator to define the types of applications to be monitored, times and days, and the end user locations from which the transactions are to originate. The operator may also choose to define alarm thresholds. Agents installed at the end user location monitor actual sample application transactions to measure performance of the applications operating over the network environment. VeriServ automatically tests applications at a fixed interval. SLM provides the flexibility for the user to schedule synthetic transactions for any interval from 5 minutes to a year. However, as these approaches are also typically directed to a particular application and require that the applications be installed and operating to generate network traffic, they generally only address simple web and database transactions. Also, any new or custom applications may require extensive configuration by the users to allow the tester to interact with the applications. In addition, active network testers add traffic to the communication network being tested, thereby using network resources which would otherwise be available for users.

All of these approaches are limited in their ability to track network performance on a continuing basis in a manner which will reflect that performance from an end user perspective across a variety of hardware, operating systems and end user specific application programs while supporting multiple network protocols under actual operating conditions. This creates particular problems as networks are typically not static as new hardware and software application programs may be periodically added thereby changing the traffic characteristics on the network and the end user's experience of network performance. This changing environment also makes it difficult if not impossible for any of these known tools to provide repeatable measurements over time for use in assessing changes in network performance while improving the efficiency of IT staffs rather than increasing their workload. It is increasingly important to analyze the actual performance of the network to be tested without the constraints and limitations of these existing tools.

SUMMARY OF THE INVENTION

The present invention provides methods, systems and computer program products for testing the performance of a communication network including a plurality of endpoint nodes executing application programs which utilize the communications network. A console node is provided on the network which may initiate operations by test agents (endpoint engines) executing on one or more of the plurality of endpoint nodes. The agents may generate network performance information using passive application monitoring and/or active endpoint pair based network testing responsive to scheduling instructions from the console node. This may potentially provide for coordinated access to the benefits of both types of network testing from the agents at the endpoint nodes using an integrated control flow from the console node. Specific application programs may be designated for passive monitoring and active test protocols may be provided based on an expected type of application communication traffic. In another aspect of the present invention, one of a plurality of types of transaction models defining the beginning and ending reference point for a transaction timing measurement may be provided to the endpoint nodes for use in passive application monitoring. The transaction model may be selected to best detect user perceived performance of the application program being monitored. In a further aspect of the present invention, the endpoint nodes may be automatically discovered by the console node through an exchange of communications over the communications network.

In one embodiment of the present invention, the performance of a communications network including a plurality of endpoint nodes is tested. A console node residing on a computer is provided to the network. A plurality of active network test connections associated with the plurality of endpoint nodes are defined, wherein each of the active network test connections is associated with a pair of the plurality of endpoint nodes and defines an endpoint node specific test protocol between the pair of the plurality of endpoint nodes to simulate communications traffic therebetween. A test schedule is defined for the active network test connections. In addition, a passive network test selection is designated for at least one of the endpoint nodes having an associated test schedule and an associated second endpoint node for execution of an associated active network test connection. The associated test schedule and the designated passive network test selection are communicated to the at least one of the endpoint nodes from the console node. Network performance test results are received from at least one of the at least one of the endpoint nodes and the associated second endpoint node at the console node based on the defined test schedule and the designated passive network test selection. The network communication test protocol may be defined based on a type of application communication traffic expected on the network.

In another embodiment of the present invention, at least one of the pair of endpoint nodes receives the associated test schedule and the designated passive network test selection. Passive monitoring of applications executing on the at least one of the endpoint nodes is activated responsive to the passive network test selection if passive network testing is requested. Active network testing is initiated based on the received test schedule. Network performance test results are reported to the console node based on the activated passive monitoring of applications and based on the initiated active network testing. The console node may be an application executing on a single computer device coupled to the network. In one embodiment, the at least one of the endpoint nodes communicates a partner endpoint node test protocol based on the endpoint node specific test protocol to the associated second endpoint node.

In one embodiment of the present invention, designating a passive network test selection further includes designating at least one application to be monitored and a port identification associated with the designated at least one application is communicated to the at least one of the endpoint nodes. The at least one of the endpoint nodes passively monitors at least one communication port of the at least one of the endpoint nodes, the at least one communication port being associated with the port identification, to obtain network performance test results associated with the designated at least one application. In one embodiment, an associated transaction model is also communicated for use in obtaining network performance test results associated with the at least one application and the network performance test results associated with the designated at least one application are generated based on the associated transaction model. The associated transaction model may be selected from the group consisting of client-delay, connect-disconnect and send-receive.

In a further embodiment of the present invention, the performance of a communications network including a plurality of endpoint nodes is tested. A console node residing on a computer is provided to the network. An active network test connection associated with a pair of the endpoint nodes is defined, the active network test connection defining an endpoint node specific test protocol between the pair of the endpoint nodes. A test schedule is defined for the active network test connection. In addition, a passive network test selection is designated for at least one of the pair of the endpoint nodes. The test schedule, including the endpoint node specific test protocol, and the designated passive network test selection are communicated to the at least one of the pair of the endpoint nodes from the console node. A partner endpoint node test protocol based on the endpoint node specific test protocol is communicated from the at least one of the pair of the endpoint nodes to the other of the pair of the endpoint nodes. Network performance test results are received from the pair of the endpoint nodes at the console node based on the test schedule and the designated passive network test selection.

In another aspect of the present invention, the performance of applications communicating over a communications network is monitored. Each of a plurality of applications are associated with a transaction model selected from a plurality of candidate transaction models. Network performance test results for the plurality of applications are obtained based on their respective transaction models. The candidate transaction models may include client-delay, connect-disconnect and send-receive.

In a further aspect of the present invention, endpoint nodes on a communications network are discovered. Inquiries are transmitted over the communications network to a plurality of candidate endpoint nodes using a User Datagram Protocol (UDP). Responses to the inquiries are received over the communications network using a Transmission Control Protocol (TCP). The inquiries may be transmitted responsive to a user request.

As will further be appreciated by those of skill in the art, while described above primarily with reference to method aspects, the present invention may also be embodied as systems and/or computer program products.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the terms "coupled" and "connected" are intended to include both directly coupled/connected and indirectly coupled/connected.

As will be appreciated by one of skill in the art, the present invention may be embodied as methods, data processing systems (apparatus) and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including semiconductor devices, hard disks, CD-ROMs, optical storage devices, or magnetic storage devices.

It is also to be understood that the present invention may be provided by combinations of steps for performing the specified functions and program instruction means for performing the specified functions. It will also be understood that these functions can be implemented by special purpose hardware-based computer systems which perform the specified functions or steps, or combinations of special purpose hardware and computer instructions.

Figure 1:
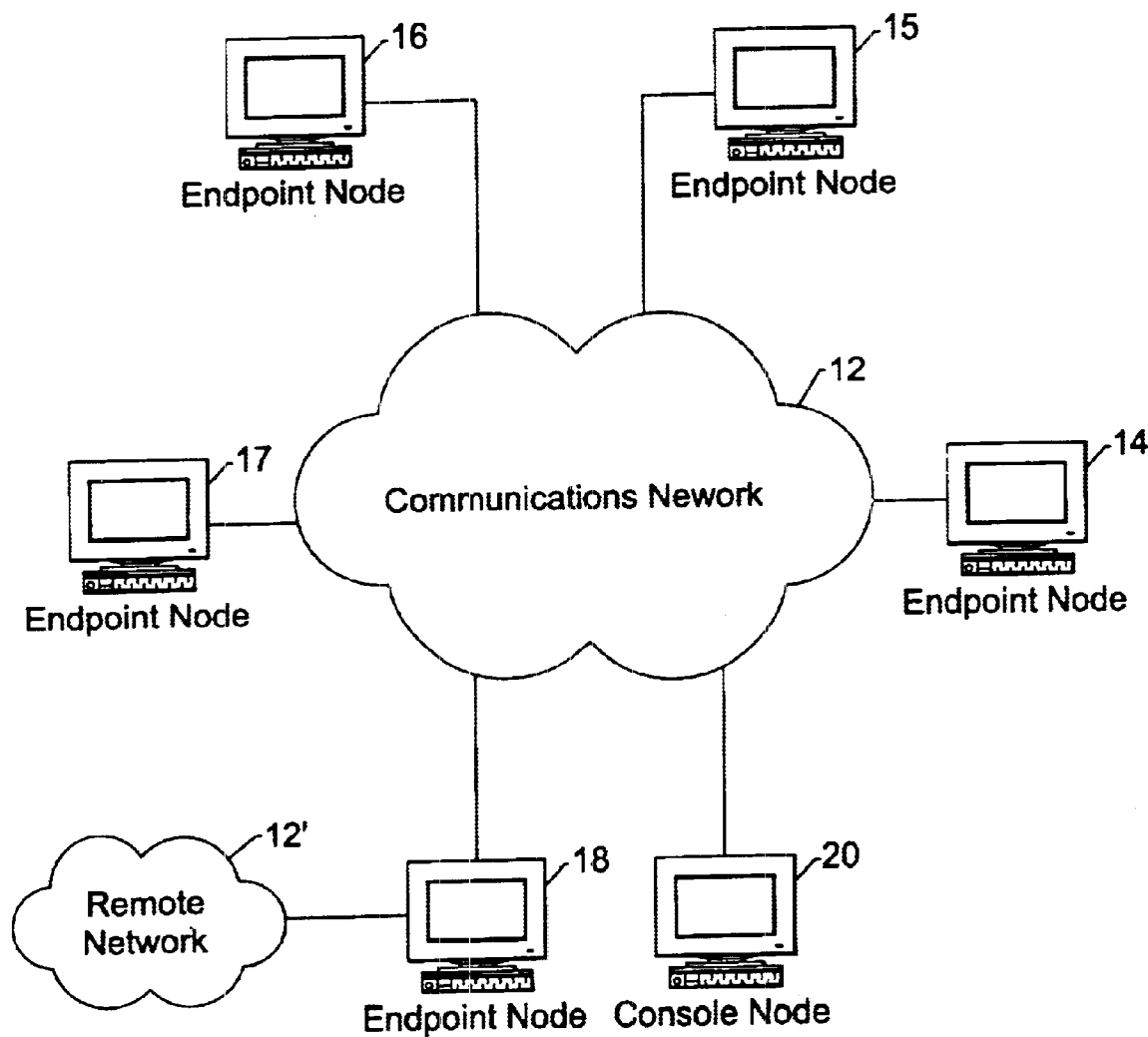
FIG. 1 schematically illustrates a hardware and software environment in which the present invention can operate.

Referring now to FIG. 1, a hardware and software environment in which the present invention can operate will now be described. As shown in FIG. 1, the present invention includes methods, systems and computer program products for analysis of data from testing the performance of a communications network 12. Communications network 12 provides a communication link between endpoint nodes 14, 15, 16, 17, 18 and console node 20. While the endpoint nodes 14, 15, 16, 17, 18 are illustrated as termination points on the communications network 12, it is to be understood that, as used herein, an endpoint node may also be implemented in a device, such as a computer, which operates as a router, switch or other network device in the communications network 12.

As will be understood by those having skill in the art, a communications network 12 may be comprised of a plurality of separate linked physical communication networks which, using a protocol such as the Internet protocol (IP), may appear to be a single seamless communications network to user application programs. For example, as illustrated in FIG. 1, remote network 12' and communications network 12 may both include a communication node at endpoint node 18. Accordingly, additional endpoint nodes (not shown) on remote network 12' may be made available for communications from endpoint nodes 14, 15, 16, 17. It is further to be understood that, while for illustration purposes in FIG. 1, communications network 12 is shown as a single network it may be comprised of a plurality of separate interconnected physical networks or partitioned sections of a physical network. As illustrated in FIG. 1, endpoint nodes 14, 15, 16, 17, 18 may reside on a computer. As illustrated by endpoint node 18, a single computer hardware system may comprise multiple endpoint nodes. However, for purposes of simplifying the description herein, endpoint nodes and associated hardware will be generally referred to as a unitary element unless referred to otherwise.

Analysis of network performance test results according to a first aspect of the present invention, as illustrated in FIG. 1, may be provided by a designated console node 20. The console node 20 may also operate to control initiation and scheduling of endpoint node acquisition of data to provide test results for analysis. The test results may be obtained by active network testing or passive application monitoring at the endpoint nodes 14, 15, 16, 17, 18 with communications traffic over the communications network 12 being measured to provide test results, such as response time, transaction time, availability, throughput, and other measures as will be understood by those of skill in the art. While the console node 20 is illustrated in FIG. 1 as implemented on a single computer, it is to be understood that the console node 20 may be implemented in part on each of a number of computers. For example, a first computer could act as a server and a second computer could act as a client device executing a browser application allowing a user to access the server computer. The actual data, in turn, could be stored in a storage device at the server computer or located on a network storage device associated with a third computer, remote from, and accessible to, the server computer. In other words, for such an embodiment, the console node 20 would be implemented across three computer devices.

Figure 2:
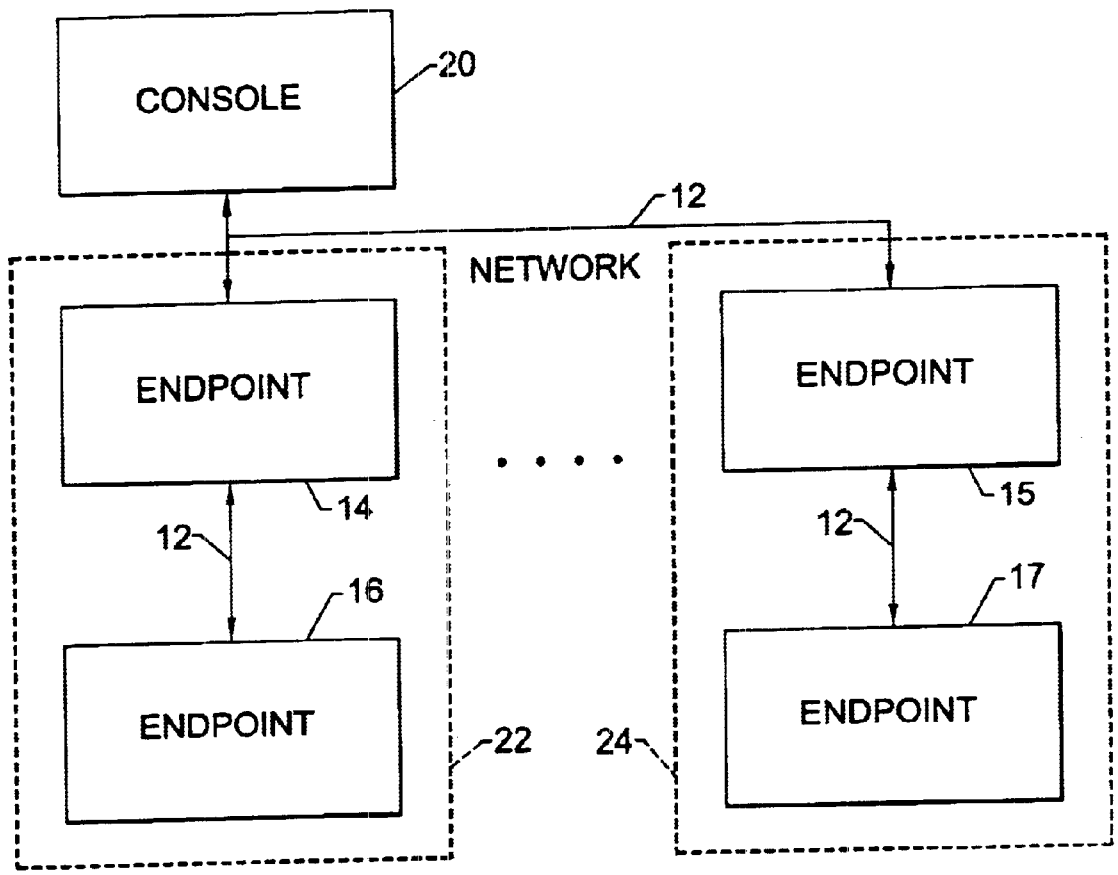
FIG. 2 is a block diagram of an embodiment of communications network performance testing according to the present invention.

As noted above, the present invention may be utilized for analysis of data from active test agents or passive application monitor agents. One such active agent is described in U.S. Pat. No. 6,397,359 filed Jan. 19, 1999 issued May 28, 2002, and entitled "Methods, Systems and Computer Program Products for Scheduled Network Performance Testing" which is hereby incorporated by reference herein. As illustrated in the embodiment of an active system included in the block diagram of FIG. 2, application communication traffic may be simulated by communications between associated endpoint node pairs 22, 24. As illustrated in FIG. 2, endpoint node 14 and associated endpoint node 16 define a first endpoint node pair 22 associated with a first connection therebetween. Similarly, endpoint node 15 and associated endpoint node 17 define a second endpoint node pair 24 associated with a second connection. While it is preferred that application communication traffic be simulated by endpoint node pairs as illustrated in FIG. 2, it is to be understood that console node 20 may also perform as an endpoint node for purposes of a performance test. It is also to be understood that an endpoint node may be associated with a plurality of additional endpoint nodes to define a plurality of endpoint node pairs each associated with a connection and each of which may be provided a test schedule from the console node 20.

Console node 20 may obtain user input, for example by keyed input to a computer terminal or through a passive monitor, to define connections associated with pairs of endpoint nodes and a test schedule for each connection to test network 12. Console node 20, or other defining means may define a test schedule including a test protocol for the connections to simulate communications traffic between a plurality of selected endpoint nodes 14, 15, 16, 17, 18. Preferably, the test protocol is an endpoint pair based specific test protocol with a plurality of endpoint node pairs executing respective associated test protocols in accordance with a test schedule. Each endpoint node 14, 15, 16, 17, 18 may be provided endpoint node information including an endpoint node specific network communication test protocol for the connection and the associated test schedule. The endpoint node information may also include result reporting frequency, connection ID, endpoint 1 requirements, endpoint 2 requirements, threshold critical values and threshold normal values. Preferably, the network communication test protocols are based on a type of application communication traffic expected to provide a test protocol which simulates application communication traffic.

Console node 20, or other defining means, may define the connections and the test schedule for each connection including specifying the endpoint nodes associated with the connection and the underlying test protocols. Test protocols contain information about a performance test including what test scripts and network protocol to use for communications between each endpoint pair 22, 24 defining connections. A given test protocol may include a plurality of different test scripts. Examples of test protocols and methods for using test protocols in network performance testing suitable for use with the present invention are described in U.S. Pat. No. 5,838,919 issued Nov. 17, 1998 and titled "Methods, Systems and Computer Program Products for Endpoint Pair Based Communications Network Performance Testing" which is incorporated herein by reference in its entirety.

A test schedule may be based on a calendar cycle. A different repeat schedule may then be provided for different days. For example, a schedule could initiate execution of a test protocol every 15 minutes from 8 am–12 pm and 1 pm–5 pm on Mondays and Tuesdays and from 8 am–5 pm on Wednesdays and Fridays. The test schedule thereby provides a start time for initiating execution of the test protocol and a repeat schedule for re-initiating execution of the test protocol. The schedule may then be set to expire, for example, after two weeks, unless a new schedule is received. An active network test system suitable for use with the present invention is described, for example, in U.S. Pat. No. 6,397,359 issued May 28, 2002, which was previously incorporated by reference herein.

In one embodiment of the present invention, as illustrated in FIG. 2, a test schedule with endpoint information including an endpoint node specific test protocol including a test script is provided first to a single endpoint node 14, 15 in each endpoint pair 22, 24. Endpoint 1 nodes 14, 15 insure that they can communicate with their respective endpoint node partners 16, 17. The endpoint 1 nodes 14, 15 then communicate an associated partner endpoint node test protocol to their respective endpoint node partners (endpoint 2 nodes) 16, 17. The associated partner endpoint node test protocol may be transmitted each time the test protocol is executed pursuant to the test schedule, thereby treating the endpoint node partners 16, 17 as if they have never previously received the protocol and relieving the endpoint node partners 16, 17 of the need to maintain previously received protocols. Alternatively, network traffic may be reduced by saving the previously transmitted associated partner endpoint node test protocol at the endpoint node partners 16, 17 and transmitting an initiate request to the endpoint node partners 16, 17 when the endpoint 1 nodes 14, 15 determine from the schedule that execution is required.

In a further alternative embodiment, endpoint 1 nodes 14, 15 may determine a corresponding test schedule including a partner endpoint node test protocol from a received test schedule and communicate that to endpoint 2 nodes 16, 17. It is to be understood that the partner test schedule including the partner endpoint node test protocol may alternatively be determined and communicated to endpoint 2 nodes 16, 17 from console node 20.

In practicing the present invention, network performance test results are generally based upon timing measurements. Accordingly, in generating the test results for analysis, as each endpoint node pair 22, 24 reaches predetermined checkpoints within a script, it creates timing records. The timing records may be returned to console node 20 which may use them to analyze the performance of communications network 12 by calculating statistics. Preferably, the endpoint nodes (or one of each pair) calculate network performance test results or measurements for a variety of types of performance measurements, for example, response times, from the timing measurements and report the calculated test results periodically to console node 20. Network performance measurement test results may include throughput, transaction rate, availability and response time. The test schedules, in addition to providing test protocols, may provide a schedule for each connection. The schedule preferably specifies the start time for initiating execution of the associated test protocol and a repeat schedule for re-initiating execution of the associated protocol. An expiration time may also be included for terminating re-execution of the associated test protocol to allow independently operating endpoint nodes to age out a schedule to avoid unintended burdening of a network 12 with test traffic. The test schedules of the different connections may, optionally, be coordinated to test particular combinations of test protocols concurrently executing over communication network 12.

Console node 20 or other means for analyzing, may provide means for analyzing reported network performance test results from endpoint node 14 or other selected reporting endpoint nodes 15, 16, 17, 18 to generate the performance measurements, such as throughput, response time and transaction rate. Alternatively, endpoint nodes 14, 15, 16, 17, 18 may analyze network data for a connection and provide the resulting performance measurements to console node 20 as network performance measurement test results.

Console node 20, or other means for detecting communications capabilities, may also detect communications capabilities of endpoint node 14, 15, 16, 17, 18 before establishing a connection and a test schedule using endpoint node 14, 15, 16, 17, 18. A pre-setup flow may, optionally, be sent from console node 20 to each endpoint node 14, 15, 16, 17, 18 identified as part of a connection or the information may be otherwise provided. The presetup flow may include a requirements list. The requirements list may include a string of bytes which indicate what communications, or other (for example, the ability to delay for random periods of time between calls), capabilities endpoint node 14, 15, 16, 17, 18 need to support in order to execute their endpoint node specific test protocol under the test schedule For example, if a test protocol uses TCP/IP as the network protocol between an endpoint node pair 22 and the test script uses Real-time Transport Protocol (RTP), the endpoint nodes of endpoint node pair 22 should support the following items which would be in the requirements list: User Datagram Protocol (UDP) and RTP (an optional feature built upon UDP to facilitate streaming of multimedia traffic).

The description of FIG. 2 above was generally provided with reference to active agent operations in which application scripts are initiated pursuant to a schedule and generate network traffic which is measured and processed to provide performance measurements. However, the console node 20 may also provide for initiation and analysis of passive application monitor generated network performance measurement test results. In accordance with an aspect of the present invention, both active and passive acquired test results are provided for analysis.

Passive application monitoring for one or more applications executing on one or more of the endpoint nodes 14, 15, 16, 17 may be initiated by the console node 20 to generate passive application monitoring test results for analysis. Such results may be associated with application programs executing on the endpoint nodes 14, 15, 16, 17 and may also be associated with each of the endpoint nodes participating in a communication connection over the communications network 12. For example, in a client-server network environment, passive application monitoring can be selected for client devices and the generated test results may be associated with the client device, the server device and the application being monitored. As a result, performance can be analyzed broken down by client, server and application. Examples of applications to be monitored include Telnet, FTP, Lotus Notes, POP3 email, DNS, Web and other applications as will be understood by those of skill in the art which communicate, for example, using assigned ports of the client devices. The communication flows may be monitored, for example, by monitoring TCP protocol stacks associated with the assigned ports of the client devices. Systems, methods and computer program products for dynamically filtering test results such as those provided according to aspects of the present invention are further described in concurrently filed U.S. patent application Ser. No. 09/479,568 filed Jan. 7, 2000 and entitled "Methods, Systems and Computer Program Products for Dynamic Filtering of Network Performance Test Results" which is hereby incorporated herein by reference.

Passive application monitor agents including system monitors may be provided at both client and server devices to monitor performance of the computer devices, such as CPU utilization, paging and disk I/O for the various computers supporting client and server operations. System monitoring functions, as used herein, are those typically directed to isolating performance problems on the client or server computer devices rather than on the network itself.

Scheduling of performance monitoring operations for an application monitor agent may proceed in a manner substantially the same as was described above with reference to active network testing in which scheduling of execution of application scripts is provided from a central console node 20 to a plurality of endpoint nodes 14–18. However, it is to be understood that parameters to be specified for application monitoring may include a select flag activating application and/or system monitoring, and an accumulation schedule for application monitoring or system monitoring data. This setup information may further specify the application(s) to be monitored, an associated port identification (range) for the applications which are to be monitored and other information, as will be understood by those of skill in the art, allowing application monitor agents on an endpoint node 14, 15, 16, 17, 18 to associate monitored network communication flows with a particular application and to further associate such flows with a remote device which is communicating with the application resident on the computer in which the application monitor is executing. Accordingly, as with the accumulation of data broken down by first and second endpoint and application script for an active monitor as described above, passive application monitoring may provide generation of data which may be broken down by client and server and by application program being monitored.

Figure 3:
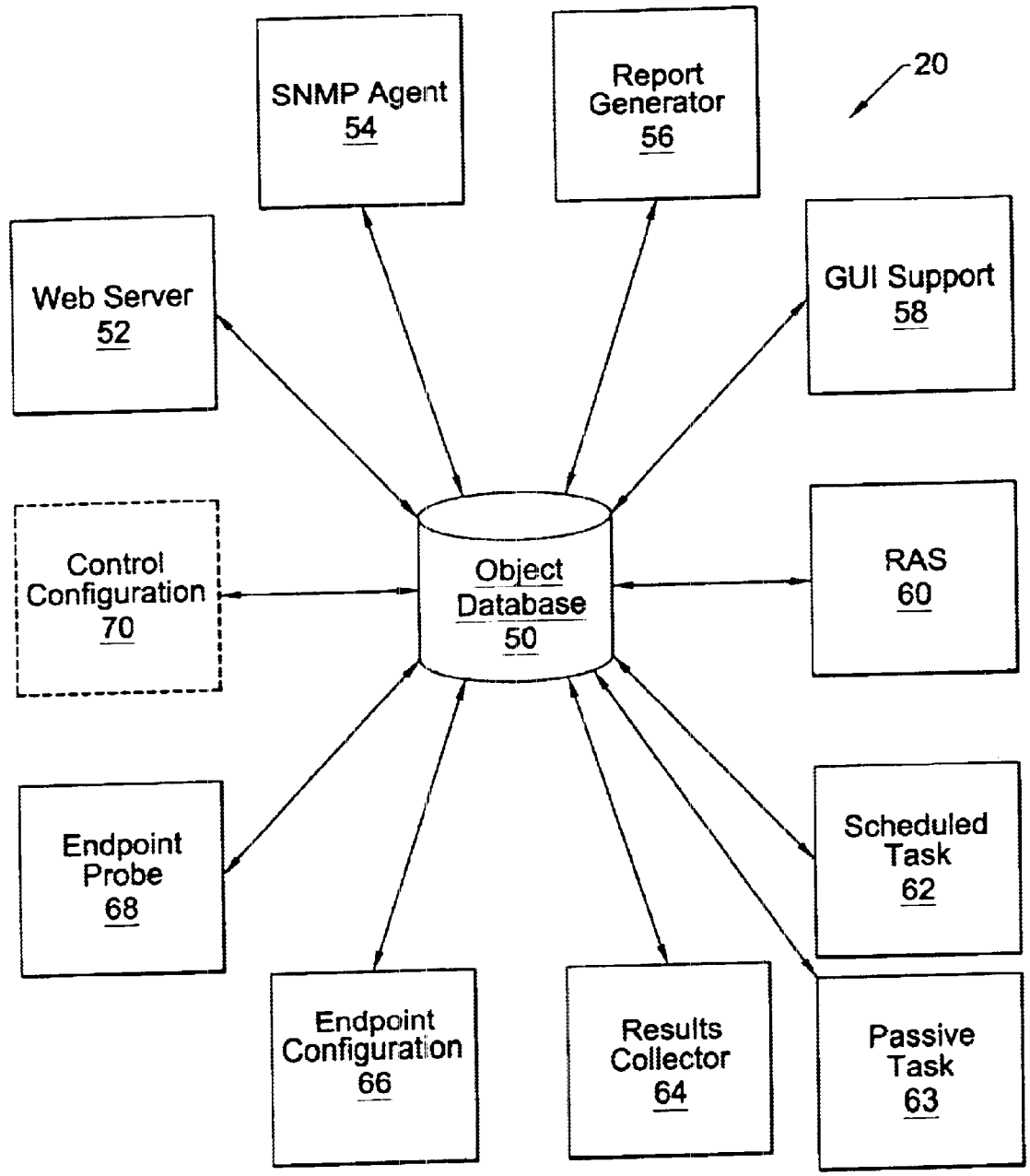
FIG. 3 is a block diagram of an embodiment of a console node according to the present invention.

Referring now to FIG. 3, the various modules of console node 20 will be further described for an embodiment of the present invention. As shown in FIG. 3, console 20 includes numerous functional blocks (or agents) which may be implemented as separately executed but interrelated code threads, interfacing with object database 50. Various blocks may, alternatively, be implemented in custom hardware circuits as appropriate. In general, the various functional blocks will be provided as a console engine executing on the computer hardware in which console node 20 is implemented. However, to simplify the discussion, the engine, node and hardware will generally just be referred to as console node 20 unless otherwise stated. Object database 50 provides storage for configuration data and performance results. Also shown in the embodiment of FIG. 3 is web server 52. Web server 52 provides a communication interface between console node 20 and users (such as a network administrator) for initiating and defining active and/or passive testing, and for generating reports and/or providing selection inputs for dynamic filtering of test results responsive to user requests. Web server 52 may be provided using a commercially available web server.

Simple Network Management Protocol (SNMP) agent 54 is responsible for providing control to allow the control node 20 to operate as a SNMP agent which may utilize standard interface protocols allowing other network management tools which may be used by a network administrator to interface with the management information base which may be generated by the present invention. The SNMP agent 54 may allow access to configuration information related to the endpoints, test results and event reports generated by the network performance system of the present invention.

Also shown in FIG. 3 is report generator 56. Report generator 56 generates reports responsive to report requests which are either automatically generated for scheduled reports or responsive to specific user requests. Report generator 56 may also provide the capabilities for formatting and printing the reports. A reporting tool suitable for use with the present invention is the Crystal Reports program available from Seagate Software. Preferably, consistent with the use of web browser and Java based techniques according to a preferred embodiment of the present invention, reports are generated in a Hyper-Text Markup Language (HTML) format. The report generator 56 may further include an analysis engine to support dynamic filtering operations.

Also shown in FIG. 3 is GUI (graphical user interface) support agent 58. GUI support agent 58 is responsible for insulating the details of the performance monitoring agents operations on console node 20 from control configuration agent 70. As will be described further, when control configuration agent 70 forwards changes, they are received by GUI support agent 58 from object database 50 and forwarded to the appropriate respective agents of the control node 20 for implementation and processing. The GUI support agent 58 is responsible for processing modifications, additions or deletions of objects in object database 50 responsive to user inputs from a GUI such as request from a user through control configuration agent 70. GUI support agent 58 both processes changes to the objects for the database 50 and further places appropriate objects into the work queues of other agents illustrated in FIG. 3 as appropriate to implement and track changes to schedules or connections which flow from the user requested changes. It is to be understood that, as used herein, a "work queue" is an ordered list of tasks to be performed by an associated agent.

RAS agent 60 is responsible for starting all performance monitoring system processes of console node 20 and monitoring their status. If any process agent fails abnormally, the RAS agent 60 restarts the failed agent. RAS agent 60 provides further reliability, availability and serviceability capability to the systems of the present invention. RAS agent 60 is preferably responsible for starting the other agents illustrated in FIG. 3, monitoring the ongoing operations of the other agents and restarting agents when they fail. RAS agent 60 may also be responsible for generating error message traps if continued failures occur even after restarts. As an additional feature, the RAS agent 60 may provide for restart of all system agents 52–70 illustrated in FIG. 3 on a periodic basis, such as weekly, to reduce error conditions. RAS agent 60 may also initiate full system restarts (i.e., including, for example, the operating system). RAS agent 60 may further provide for generating error messages and/or SNMP traps when disk space for object database 50 goes below minimum levels.

Scheduled task agent 62 is responsible for performing tasks that need to be executed based on a determined schedule. Examplary tasks performed by scheduled task agent 62 may include invoking the sending of updated schedules for all active connections on a weekly basis, such as Sunday morning at an early hour when the network is unlikely to be experiencing significant user traffic. Other functions which may be provided by scheduled task agent 62 include generation of scheduled periodic reports by submitting requests to report generator 56, computation of daily and monthly result summaries from results stored on object database 50, computation of automatic thresholds and determining if endpoint nodes 14, 15, 16, 17, 18 have failed to contact the console node 20 as expected.

In one aspect of the present invention, the scheduled task agent 62 periodically, or, preferably, at user initiated times, attempts to automatically discover endpoints on the computer network 12. The scheduled task agent 62 may attempt to discover the endpoint nodes 14, 15, 16, 17, 18 by transmitting an inquiry over the communications network 12 using the User Datagram Protocol (UDP). Responses may be received over the communications network 12 using the Transmission Control Protocol (TCP). This approach may provide for a reduction in resources associated with discovering endpoint nodes through the transmission of inquiries using UDP while maintaining the advantages of TCP for registration related operations when an endpoint node is discovered. It is to be understood that the use of UDP may be less reliable and occasionally may result in a failure to discover an endpoint node which is present on the network. However, it is believed by the present inventors that the benefits of the reduced use of system resources may outweigh any such failure risk.

For the illustrated embodiment of FIG. 3, a passive task agent 63 is also provided that designates a passive network test selection for one or more of the endpoint nodes 14, 15, 16, 17, 18. The passive task agent 63 may further include a module for selecting one of a plurality of transaction models to be associated with application programs to be passively monitored according to a further aspect of the present invention. The designation of a passive network test selection may include a port identification for each application program which port identification may include one or more communication ports associated with a particular application. For example, Telnet is typically associated with communication port 23 for computer devices supporting TCP/IP communications. Similarly, SMTP is typically associated with communication port 25. Other application program port identifications will be understood by those of skill in the art.

The passive network test selection may further include a transaction model for the application programs. For example, a send-receive model may be selected for Telnet and a connect-disconnect model may be selected for SMTP. The passive network test selection is preferably communicated to the endpoint nodes 14, 15, 16, 17, 18 with the test schedule for active monitoring as will be further described herein.

Results collector agent 64 receives test results from the endpoint nodes 14, 15, 16, 17, 18. The results may be timing records of a successful test or an indication that a test failed to run. Result collector agent 64 may be implemented as a plurality of threads executing on control node 20 to support inbound connections from a plurality of the endpoint nodes 14, 15, 16, 17, 18. Different threads can be provided to support different network protocols for various endpoint nodes 14, 15, 16, 17, 18 such as APPC, SPX or TCP. Received results may be parsed and stored in object database 50. In addition, results collector agent 64 may provide for updating of results summaries in object database 50 if results from any connections are untimely received after the summaries for a given period have already been calculated. Different threads may be initiated to support each endpoint node 14, 15, 16, 17, 18 actively transferring results to console node 20. Results collector agent 64 can further provide means to detect errors in data transfers whether from a communication problem or because of errors encountered during the test itself.

In addition, if an endpoint node 14, 15, 16, 17, 18 reports a failure or threshold crossing (exception event), results collector agent 64 may perform specified actions as appropriate for the reported error condition. Appropriate actions, as will be described later, may include sending SNMP traps to other network applications through SNMP agent 54 or executing a command locally on console node 20. A separate threshold crossing thread is provided in results collector 64 to handle processing of input results indicating violation of any threshold criteria by a threshold crossing exception event.

Endpoint configuration agent 66 is responsible for delivering test schedules and passive network test selections to the endpoint nodes 14, 15, 16, 17, 18. Related functions may include computing and distributing schedules and updating schedules on a periodic basis. Furthermore, endpoint configuration agent 66 may be responsible for detecting and marking individual endpoint nodes 14, 15, 16, 17, 18 as being in an inoperative condition when an endpoint node 14, 15, 16, 17, 18 cannot be successfully contacted. For example, this may be done after iteratively trying to establish a connection between console node 20 and the endpoint node 14, 15, 16, 17, 18 using each available alternative communication protocol and device address without establishing a successful connection to the individual endpoint node 14, 15, 16, 17, 18.

Endpoint configuration agent 66 may also monitor the status of various endpoint nodes 14, 15, 16, 17, 18 by computing a reporting period for each endpoint node 14, 15, 16, 17, 18 based on the test schedules and placing appropriate information in object database 50 to indicate to other agents when network performance test results should be expected from particular endpoint nodes 14, 15, 16, 17, 18 and associated connections. Endpoint configuration agent 66 may further detect and report when an endpoint pair 22, 24 is invalid if an individual one of the endpoint pair 22, 24 reports in with an indication that it is unable to establish a connection with its established endpoint pair partner for a particular connection.

Endpoint probe agent 68 is responsible for contacting endpoint nodes 14, 15, 16, 17, 18 that are in an inoperative condition. Endpoint probe agent 68 periodically attempts to contact inoperative endpoint nodes 14, 15, 16, 17, 18 until they can be reached or removed from object database 50 as an active endpoint node 14, 15, 16, 17, 18. Endpoint probe agent 68 may also be provided the capability to automatically assess configuration information about prospective endpoint nodes 14, 15, 16, 17, 18, such as protocols supported, addresses, operating systems and so on, when new endpoint nodes 14, 15, 16, 17, 18 are identified and added to object database 50. Endpoint probe agent 68 further may periodically attempt to contact inoperative endpoint nodes 14, 15, 16, 17, 18 until they can be returned to an active condition.

As described with endpoint configuration information collection, endpoint probe agent 68 may also attempt to establish contact with inoperative endpoint nodes 14, 15, 16, 17, 18 using all available known communication protocols and addresses. Once an endpoint node 14, 15, 16, 17, 18 is successfully contacted, endpoint probe agent 68 retrieves the endpoint configuration information and updates object database 50 to establish that it is no longer an inoperative endpoint node 14, 15, 16, 17, 18. Preferably, the frequency of attempts to contact an inoperative endpoint node 14, 15, 16, 17, 18 goes down the longer an endpoint node 14, 15, 16, 17, 18 stays inoperative. However, it is preferred that endpoint probe agent 68 attempt to contact any inoperative endpoint nodes 14, 15, 16, 17, 18 at least one time per day. As with various of the other agents of FIG. 3 discussed herein, endpoint probe agent 68 may be provided with the capability to perform actions, such as SNMP traps or executing a command, responsive to conditions, such as an inoperative endpoint node 14, 15, 16, 17, 18.

Also shown in FIG. 3 is control configuration agent 70. As illustrated by the dotted line used for control configuration agent 70 in FIG. 3, it is preferred that this agent be executed remotely from the system on which object database 50 resides. This allows the actual database hardware of console node 20 to be placed in a secure area with remote user access to change system parameters. Preferably, control configuration agent 70 is provided as a Java application executing on a remote device in communication with console node 20. As will be described more fully herein with respect to the operations of the present invention, the control configuration agent 70 can provide for input of configuration information for various aspects of test operations according to the present invention such as definition of endpoints and endpoint pairs, thresholds, actions, schedules, test scripts, department and location definitions, security protocols, reporting procedures, SNMP definition, system defaults and user defaults. Control configuration agent 70 further may provide for input of status change requests with respect to various endpoint nodes 14, 15, 16, 17, 18 or endpoint pairs 22, 24 such as taking a particular endpoint node 14, 15, 16, 17, 18 off of active status.

While illustrated in FIG. 3 as connected directly to object database 50, changes to the object database 50 may not be directly implemented by control configuration agent 70. Rather, GUI support agent 58 can provide an interface allowing changes to be implemented based on requests from control configuration agent 70, on an asynchronous basis, as various other agents perform their associated functions to change the status of devices and protocols within the network performance test schedules. Accordingly, the direct connection of control configuration agent 70 to object database 50 illustrates the placement of information on the database which may then be retrieved by GUI support agent 58 for processing and implementation. As will be described later herein, in one aspect of the present invention, a unique approach is provided for handling the asynchronous state transitions between requested changes and implementation of the changes across the affected nodes of the computer network 12.

The various agents illustrated in FIG. 3 may generally be referred to as the console engine of a network performance system according to the present invention. As described with respect to FIG. 3, however, the console engine executing on console node 20 is preferably implemented as a variety of code threads independently executing and performing different functions through coordinated usage of object database 50. Similarly, an endpoint engine is provided and executed on each of the devices supporting endpoint nodes 14, 15, 16, 17, 18 to implement the endpoint node functions according to the present invention.

Endpoint engines executing on endpoint nodes 14, 15, 16, 17, 18 respectively receive test schedules and passive network test selections and store the received test schedules and passive network test selections in memory available to endpoint nodes 14, 15, 16, 17, 18. They further initiate execution of tests based on the stored information, monitor performance during the tests and collect results from the tests. The results are stored until the appropriate time for a batch or event driven reporting of results to control node 20. In addition, endpoint engines of the present invention preferably generate and calculate network performance results locally from measurements during tests and further provide for comparison of the calculated network performance results to threshold criteria value. The endpoint engine on endpoint nodes 14, 15, 16, 17, 18 may further be responsible for reporting endpoint configuration information responsive to requests from control node 20 and for performing pre-setup and setup operations between respective endpoint nodes 14, 15, 16, 17, 18 (or otherwise incorporating related information in a pair configuration information flow) defining an endpoint node pair for a particular connection. Endpoint engines according to the present invention otherwise may provide capabilities in a manner described in U.S. Pat. No. 5,838,919 issued Nov. 17, 1998. In any event, as noted previously, for simplicity, endpoint engines will not generally be distinguished from endpoint nodes 14, 15, 16, 17, 18 herein. It is further to be understood that the endpoint nodes 14, 15, 16, 17, 18 support both active testing using endpoint pairs and passive application monitoring of designated application programs executing on the respective endpoint nodes 14, 15, 16, 17, 18 responsive to the console node 20 as will be further described.

While active network testing typically establishes a transaction model implicitly through the associated test protocol, a transaction model generally should be provided for a passive application monitor. In one aspect of the present invention a plurality of different transaction models are provided for use in defining start and stop times for timing measurements for use with passive application monitor data acquisition. The provision of multiple transaction models may allow a wide range of different applications to be passively monitored. Transaction models available for selection for application monitoring according to one embodiment of this aspect of the present invention will now be described with reference to FIGS. 4A–4C. For purposes of this description a client-server network environment will be utilized and the first endpoints 14, 15 will be referred to as a client devices (or endpoints or endpoint nodes) and the associated second endpoint nodes 16, 17 will be referred to as server devices (or endpoints or endpoint nodes).

Figure 4A:
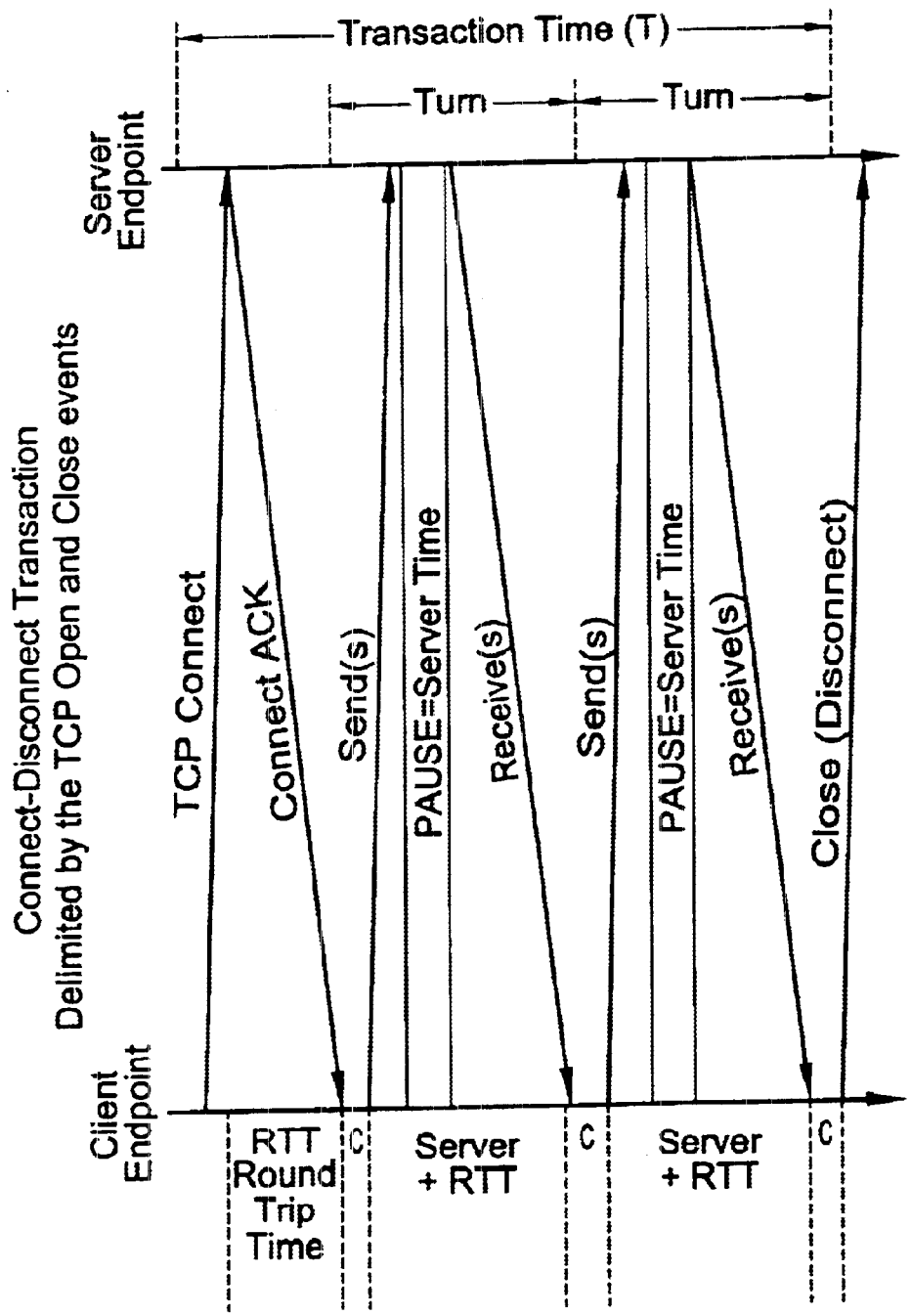
FIGS. 4A–4C are schematic timing diagrams illustrating transaction models for passive application monitoring according to an embodiment of the present invention.

A first transaction model based upon TCP connect and disconnects is illustrated in FIG. 4A (a connect-disconnect model) in which a transaction starts with a TCP connect and ends when a disconnect is provided by a client or a server. As shown in FIG. 4A, the transaction time for this model begins with detection of a TCP connect at the client endpoint and ends with detection of a TCP close or disconnect transmission at the client endpoint. Numerous intermediate time determinations are also provided utilizing the model for transactions shown in FIG. 4A. A round trip time (RTT) is detected starting at transmission of the TCP connect and ending with receipt of a connect acknowledge from the server endpoint. A first client time (C) is then measured from receipt of the connect acknowledge until the next transmit signal is received in the TCP stack from the client resident application. A server round trip time (Server+RTT) is measured from the time of the send transmission at the client endpoint until receipt of a responsive transmission at the client endpoint. Note that the intermediate server delay time is not generally directly detectable at the client endpoint but may be determined at the server endpoint. Additional client delay times (C) may be measured starting at receipt of the Receive signal from the server endpoint to the second packet Send from the client endpoint to the server endpoint and from the subsequent Receive from the server endpoint through the Close (or Disconnect) signal from the client endpoint. Similarly, an additional Server+RTT time is shown in FIG. 4A. It is further to be understood that a number of additional send and receive exchanges with corresponding client and server roundtrip delay times may be measured for a given transaction between connect and disconnect signals according to the present invention.

Note that, as illustrated in FIG. 4A, a single transaction may include multiple sends (without an intervening responsive receive) and may be followed by multiple receives (without an intervening send). In such circumstances, the time between the first send and the last send may be treated as network time (as opposed to associating it with server or client time). Similarly, the time between the first receive and the last receive may be treated as network time.

Figure 4B:
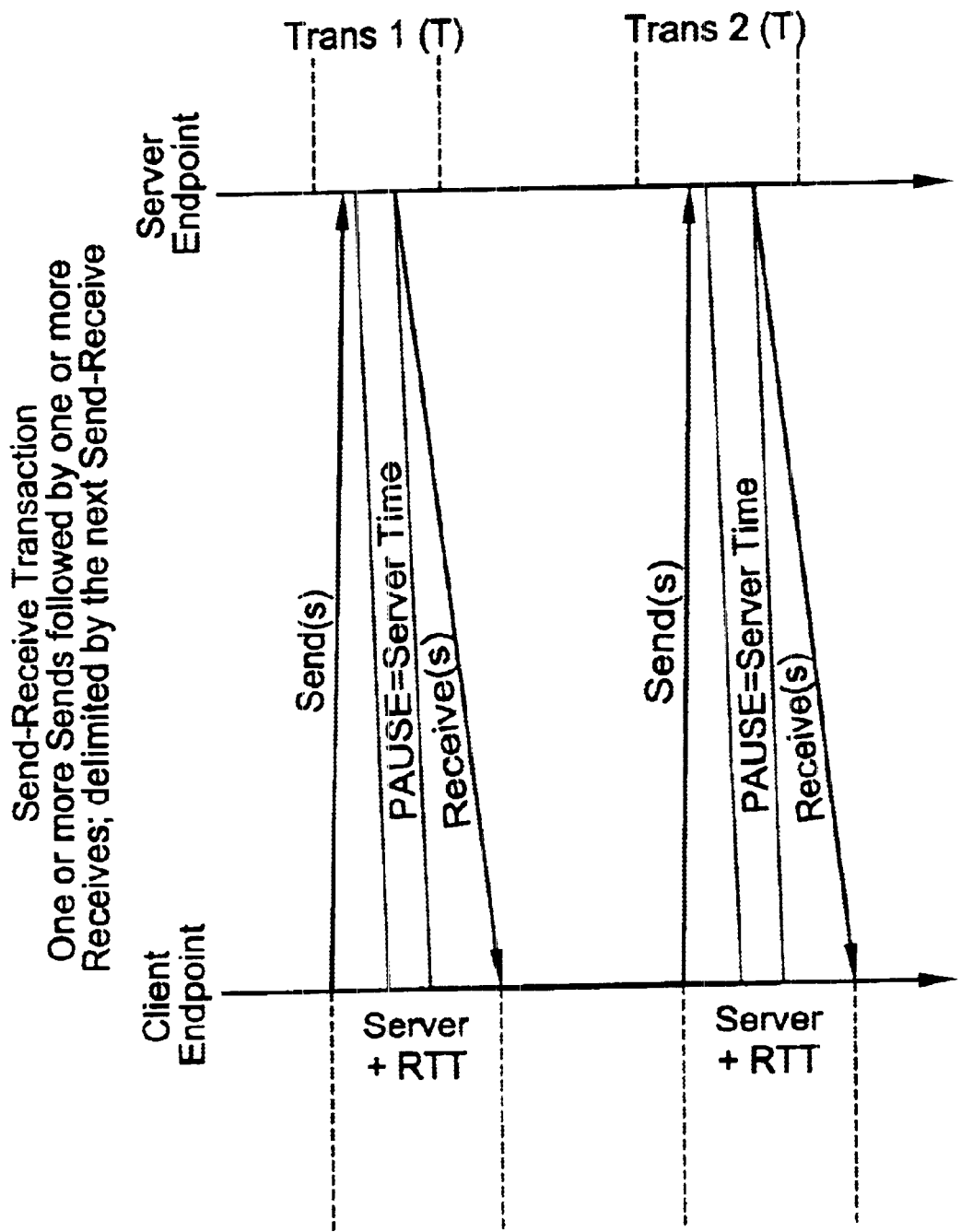

A second transaction model, referred to as the send-receive transaction model, will now be described with reference to FIG. 4B. In the illustration of FIG. 4B two separate transactions (Trans 1, Trans 2) are illustrated. For each transaction, a transaction time (T) corresponding to the server roundtrip delay time (Server+RTT) is measured starting with transmission of a packet Send at the client endpoint through receipt of a Receive signal at the client endpoint.

Figure 4C:
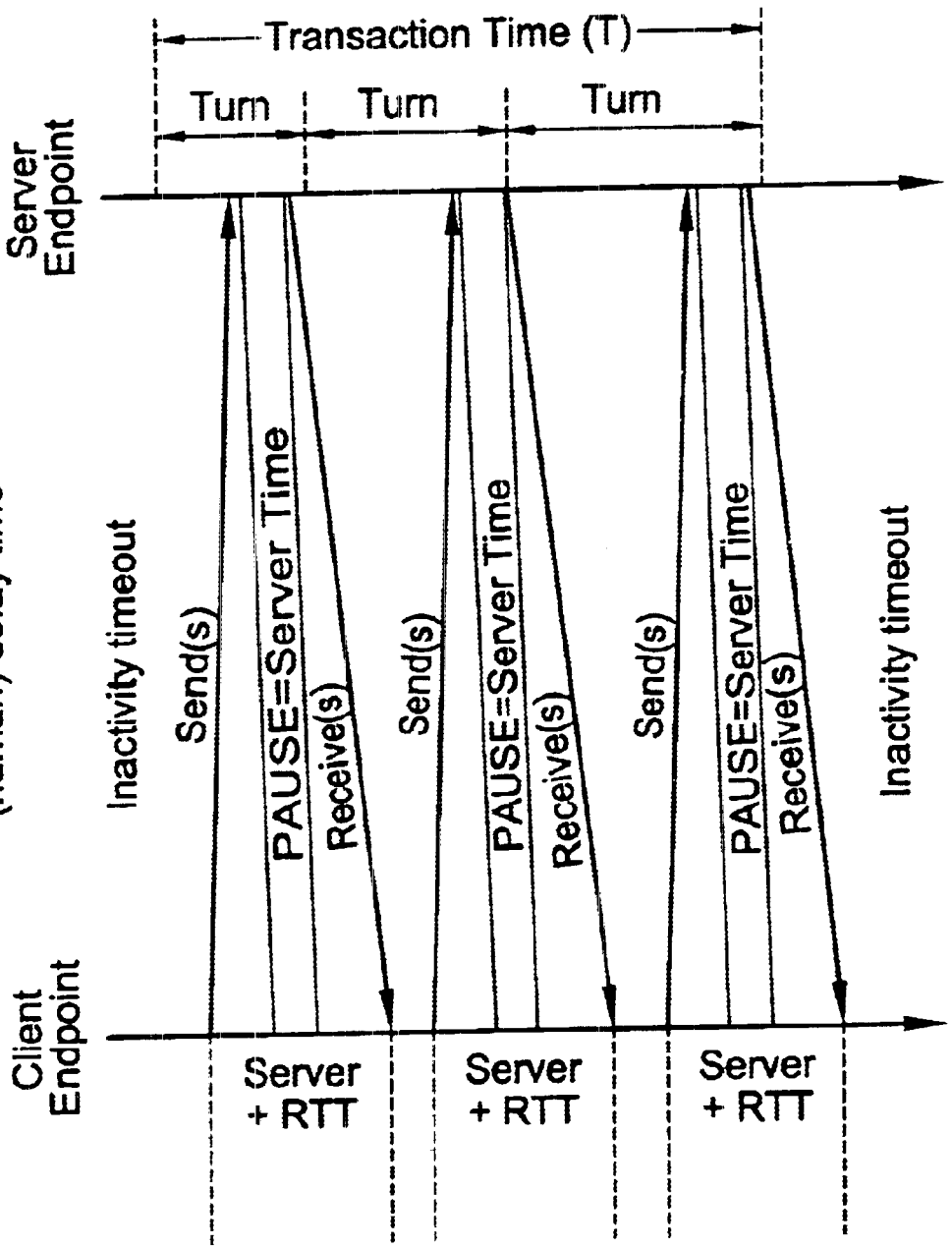

A third transaction model will now be described with reference to FIG. 4C. The transaction model illustrated in FIG. 4C may be identified as a client-delay transaction model. In general, the client delay transaction model includes multiple sends and receives within a single transaction time delimited by client (i.e., in this case user) delay time as contrasted with TCP connect and disconnect signals as with the transaction model described with reference to FIG. 4A. The transaction model based on client-delay assumes, that, from the user's perspective, client delays exceeding some minimum or threshold criterion reflect a demarcation, from the user's perspective, of different transactions. Accordingly, relatively short client delays between receipt of receive signals at the client endpoint through transmission of send signals are not treated as transaction demarcations, whereas the longer client inactivity periods, referred to in FIG. 4C as Inactivity timeouts, are treated as demarcations of a transaction time measurement window.

The different transaction models are preferably selected by a user and associated with a particular application as an initial setup procedure before initiation of application monitoring tests based on the various transaction models. The appropriate transaction model should be determined based upon the characteristics of the application to be monitored and, more particularly, should be selected based upon the transaction model which will allow measurements which most accurately reflect a user's perception of system performance. Accordingly, the provision of three transaction models may facilitate network performance measurements and exception detection which will more accurately detect network conditions which would be perceived as a problem by users and, thereby, would require prompt attention from the IT staff organization supporting the network being monitored. Example of applications, their associated ports and preferred transaction models are provided in Table 1 below.

TABLE 1

| Application | Port Number(s) | Transaction Model |
| --- | --- | --- |
| BAAN | 512 | client-delay |
| DNS | 53 | send-receive |
| Exchange | 139 | client-delay |
| FTP | 20 (data) | connect-disconnect |
|  | 21 (control) |  |
| Lotus Notes | 1352 | client-delay |
| NT File/Print | 139 | client-delay |
| Oracle | 5432 | client-delay |
| POP3 email | 110–111 | send-receive |
| SMTP | 25 | connect-disconnect |
| Telnet | 23 | send-receive |
| Web | 30 | client-delay |

Operations of the present invention will now be described with respect to the flowchart illustrations of FIGS. 5 through 8. It will be understood that each block of the flowchart illustrations and the block diagram illustrations of FIGS. 1–3 and combinations of blocks in the flowchart illustrations and the block diagram illustrations, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions. For example, the dynamic filter module 310 may be implemented as code executing on a processor, as custom chips or as a combination of the above.

Figure 5:
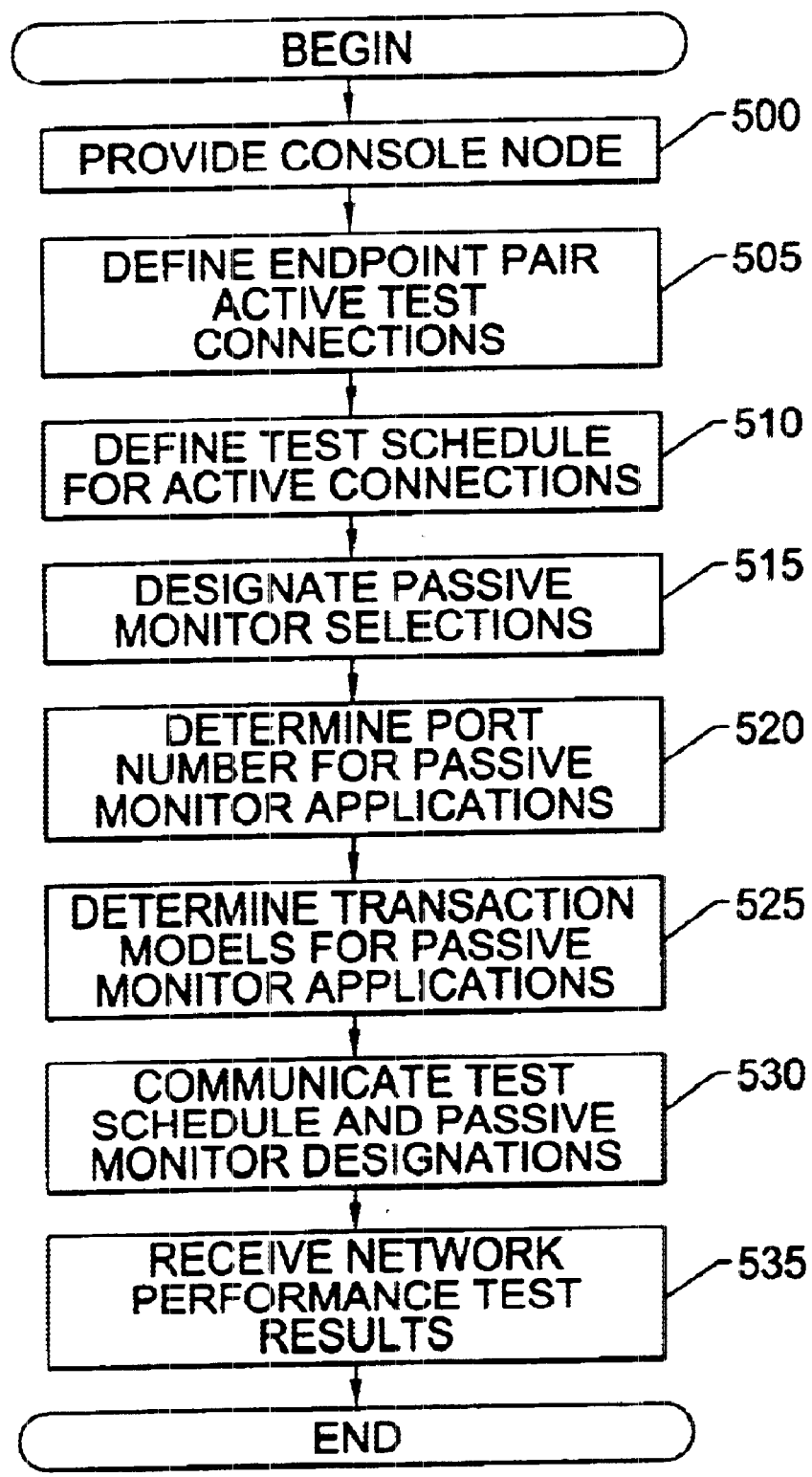
FIG. 5 is a flowchart illustrating operations for testing the performance of a communications network according to an embodiment of the present invention from the perspective of a console node.

Referring now to the flowchart illustration of FIG. 5, operations for an embodiment of testing the performance of a communication network including a plurality of endpoint nodes from the perspective of a console node 20 will now be further described. It is to be understood that the order of operations in the flowcharts are not critical to the present invention and that operations at some blocks may be omitted and/or repeated in various embodiments. Operations begin at block 500 with provision of a console node, for example, by adding a console node 20 residing on a computer to the communications network 12. A plurality of active network test connections associated with the endpoint nodes on the network including agents according to the present invention are defined (block 505). Each of the active network test connections is preferably associated with a pair of the endpoint nodes and defines an endpoint node specific test protocol between the pair of endpoint nodes to simulate communication traffic therebetween. In an alternative embodiment, operations at block 505 provide for defining an active network test connection associated with a pair of endpoint nodes where the active network test connection defines an endpoint node specific test protocol between the pair of endpoint nodes. A test schedule is defined for the active network test connection(s) (block 510).

In connection with the passive application monitoring aspects of the present invention, a passive network test selection is designated for one of the endpoint nodes which was provided an associated test schedule at block 510 (block 515). In other words, in accordance with the present invention, at least one endpoint node is provided both a test schedule for active network testing and passive network test selection for passive application monitoring to test the performance of the communications network 12.

In the illustrated embodiment of FIG. 5, the console node 20 provides a passive network test selection designation which may specify one or more particular application programs to be monitored (block 515). Furthermore, the console node 20, in connection with the passive network test selection designation, further determines port identifications associated with the application programs designated for monitoring (block 520). The console node 20 may further determine an associated transaction model for use in obtaining network performance test results for one or more of the application programs to be monitored (block 525). The test schedule and the passive network test selection designation are preferably communicated to the endpoint nodes 14, 15, 16, 17, 18 in an integrated scheduling flow (block 530). The console node 20 further receives network performance test results from at least one of the endpoint nodes 14, 15, 16, 17, 18 based on the defined test schedule and the designated passive network test selection (block 535). Network performance test results may be reported responsive to exception events, on a scheduled periodic basis and/or responsive to a request for a report from the console node 20.

Figure 6:
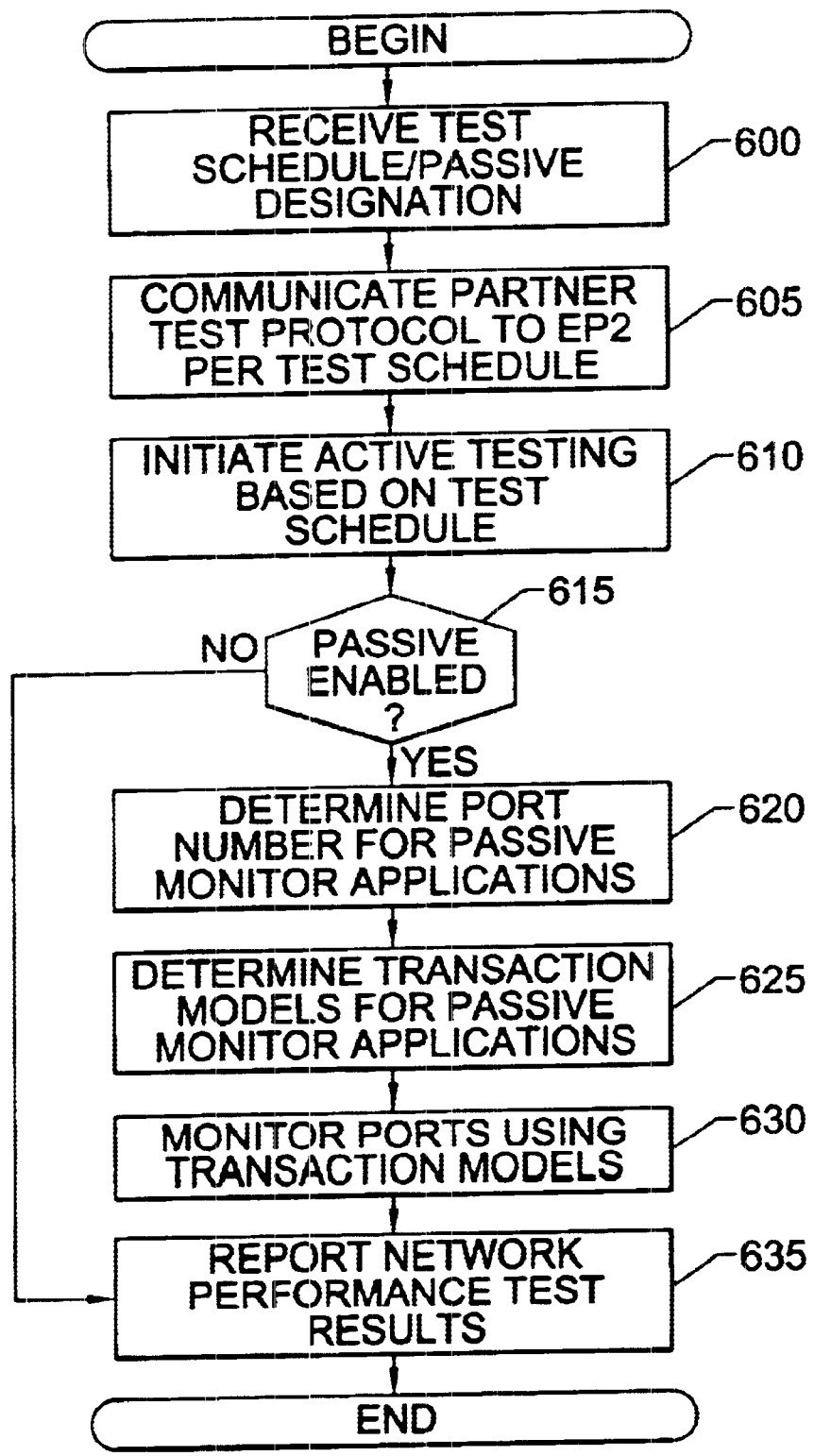
FIG. 6 is a flowchart illustrating operations for testing the performance of a communications network according to an embodiment of the present invention from the perspective of an endpoint node.

Referring now to the flowchart illustration of FIG. 6, operations for testing the performance of the communications network 12 from the perspective of an endpoint node 14, 15, 16, 17, 18 will now be further described for an embodiment of the present invention. Operations begin at block 600 with the receipt by an endpoint node 14, 15, 16, 17, 18 of a test schedule and a passive network test selection. In one embodiment of the present invention, a receiving first endpoint node 14, 15 of an endpoint node pair 22, 24 may communicate a partner endpoint node test protocol based on a received endpoint node specific test protocol from the first endpoint node 14, 15 to the second endpoint node 16, 17 (block 605). Alternatively, each endpoint node of an endpoint node pair may receive its associated protocol and passive network test selection directly from the console node 20.

Endpoint nodes 14, 15, 16, 17, 18 may initiate active network testing based on the received test schedules in accordance with the received test protocols (block 610). In addition, endpoint nodes 14, 15, 16, 17, 18 receiving a passive network test selection requesting passive network testing (block 615) may activate passive monitoring of applications as will be described with reference to blocks 620 through 630 for the embodiment of FIG. 6. A port number may be determined for each application program to be monitored based on the received passive network test selection (block 620). A transaction model may also be selected for each of the application programs to be monitored (block 625). In one embodiment, the transaction model is provided to the endpoint nodes 14, 15, 16, 17, 18 from the console node 20, for example, along with the communicated passive network test selection. Alternatively, transaction models for each application program expected to be subject to application monitoring may be identified at each of the endpoint nodes 14, 15, 16, 17, 18 and stored therein, for example, as part of an initial setup operation when the endpoint node engines are installed. In this case, the transaction models may be selected at the endpoint nodes 14, 15, 16, 17, 18 based on information stored therein. Suitable transaction models for use with testing the performance of the communication network 12 include those described previously with reference to FIGS. 4A–4C.

Endpoint nodes 14, 15, 16, 17, 18 activating passive monitoring may monitor the communication ports associated with the port identifications received from the console node 20 and use associated transaction models for each application program to obtain network performance test results (block 630). These test results may be associated with the application program, for example, by an application program identification number shared with the console node 20 to provide control over tracking and storage of data received at the console node 20 from a plurality of endpoint nodes 14, 15, 16, 17, 18. The results may also be associated with an identifier of the endpoint node performing the passive monitoring as well as the partner endpoint node communicating with the application program being monitored. For example, the endpoint node performing passive monitoring is preferably selected as the client device for the application program with the partner device executing server related operations. Both the client and server identifications may be associated with each measurement for monitoring operations at block 630. Network performance test results may be transmitted to the console node 20 as described above with respect to reporting of active network testing test results (block 635).

Figure 7:
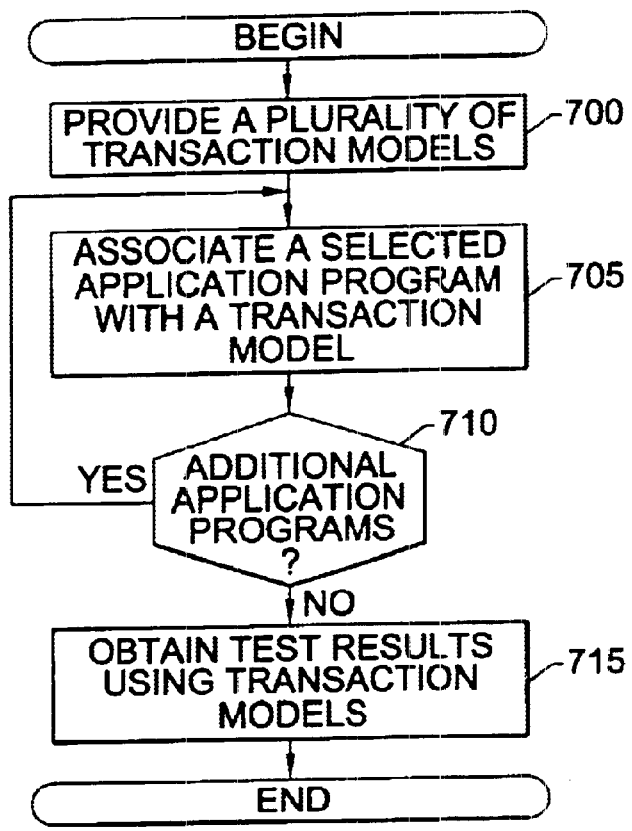
FIG. 7 is a flowchart illustrating operations for providing transaction models to application programs to be passively monitored according to an aspect of the present invention.

Referring now to FIG. 7, operations according to an embodiment of another aspect of the present invention will now be further described. More particularly, operations illustrated in FIG. 7 further detail the selection of transaction models to be associated with application programs for passive monitoring. A plurality of transaction models, such as those described with reference to FIGS. 4A–4C, are provided (block 700). A selected application program is associated with one of the plurality of candidate transaction models (block 705). If additional application programs are to be monitored (block 710), operations at block 705 repeat to provide a transaction model to be associated with each such application program. Network performance test results are obtained for the application programs based on their respective transaction models (block 715).

Figure 8:
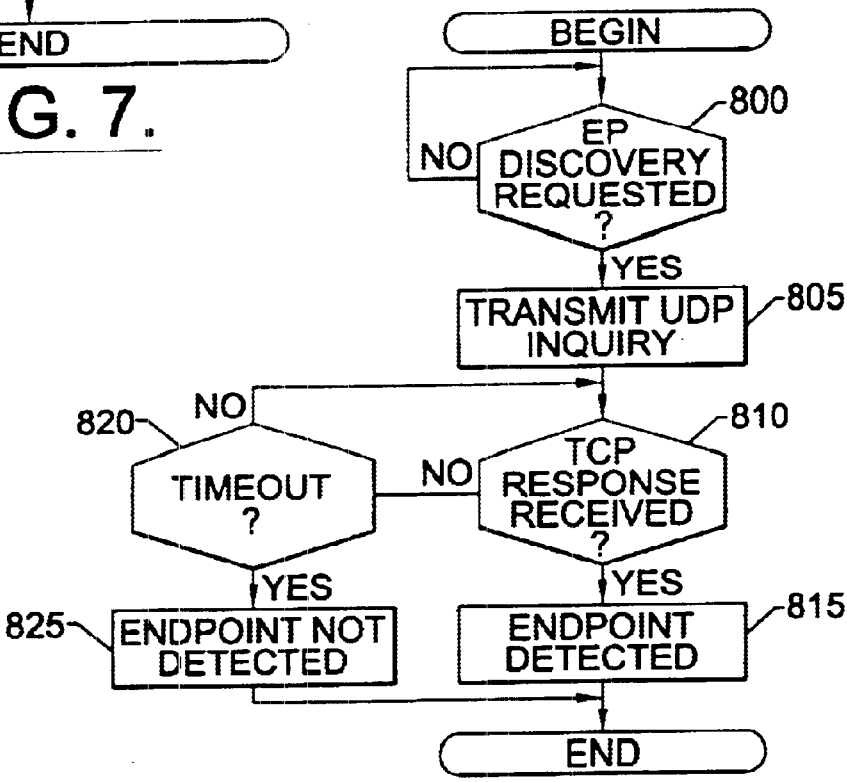
FIG. 8 is a flowchart illustrating operations for discovering endpoint nodes on a communications network according to a further aspect of the present invention.

Referring now to FIG. 8, operations according to an embodiment of a further aspect of the present invention related to discovery of endpoint nodes 14, 15, 16, 17, 18 on the communications network 12 will now be further described. For the embodiment illustrated in FIG. 8, endpoint discovery operations are initiated responsive to a request such as a user request. Accordingly, operations begin when an endpoint discovery requested is received (block 800). An inquiry is transmitted over the communications network 12 to a plurality of candidate endpoint nodes which may be resident on the communications network 12 (block 805). Preferably, individual addresses for each device, such as an IP address, are utilized rather than a broadcast type message. Preferably, the inquiries are transmitted using the User Datagram Protocol (UDP) which may reduce resources required of the network and the devices thereon in executing the discovery operations. In contrast, responses to the inquiries according to the present invention are provided over the communications network 12 using the Transmission Control Protocol (TCP) which may be better suited to supporting registration related operations associated with the detected endpoint node 14, 15, 16, 17, 18 in a more reliable manner.

If a TCP response is received (block 810), an endpoint is detected (block 815). If no TCP response is yet received (block 810) and a selected timeout period for waiting for responses has not expired (block 820), the console node 20 continues to wait for a TCP response from endpoint nodes 14, 15, 16, 17, 18 for which an inquiry has been transmitted. Otherwise, once the timeout period has expired (block 820), the console node 20 determines that an endpoint has not been detected (block 825). It is to be understood that operations as described with reference to FIG. 8 may be applied for each of a number of candidate endpoint nodes, some of which may be detected and some of which may not be detected.

Figure 9A:
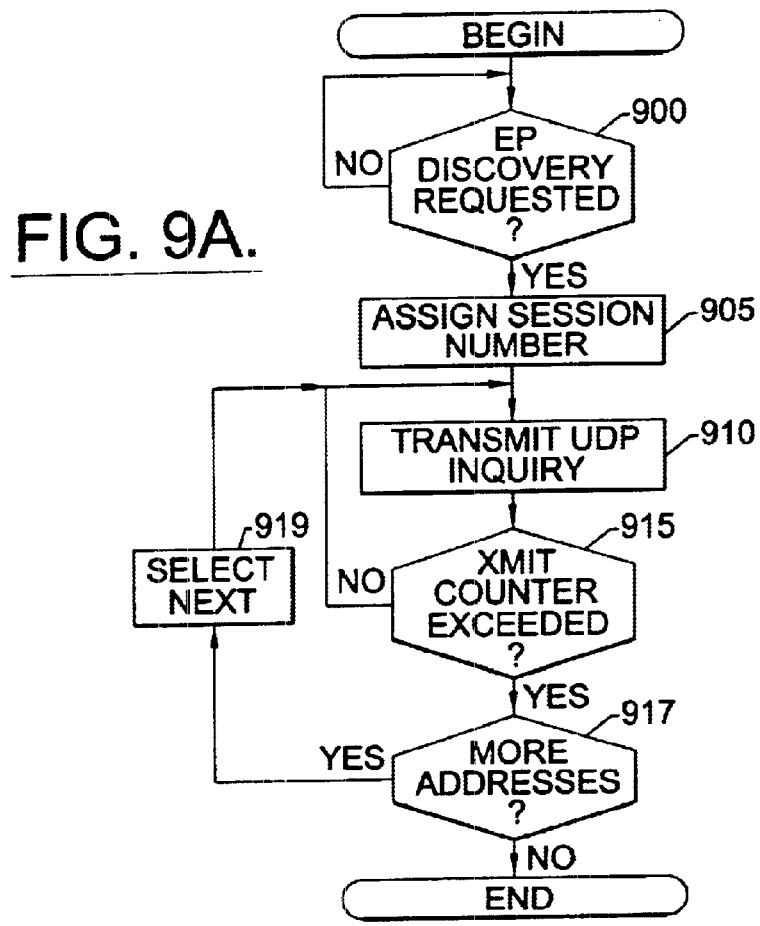
FIGS. 9A–9C are flowcharts illustrating operations for another embodiment of discovering endpoint nodes on a communications network according to the autodiscovery aspect of the present invention.
Figure 9B:
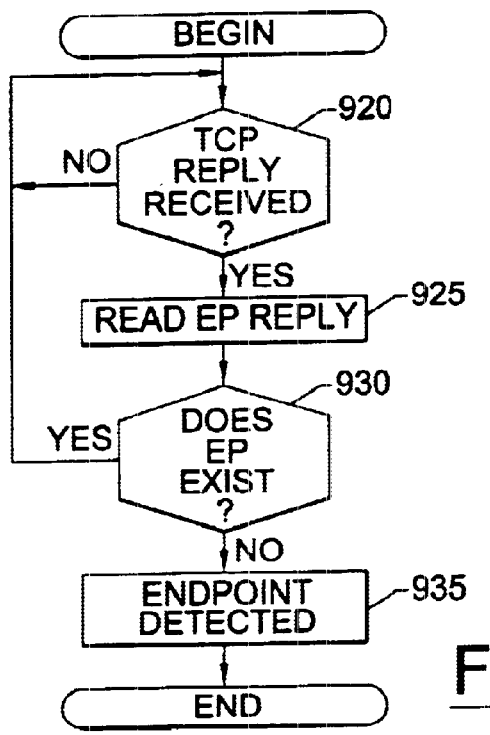
Figure 9C:
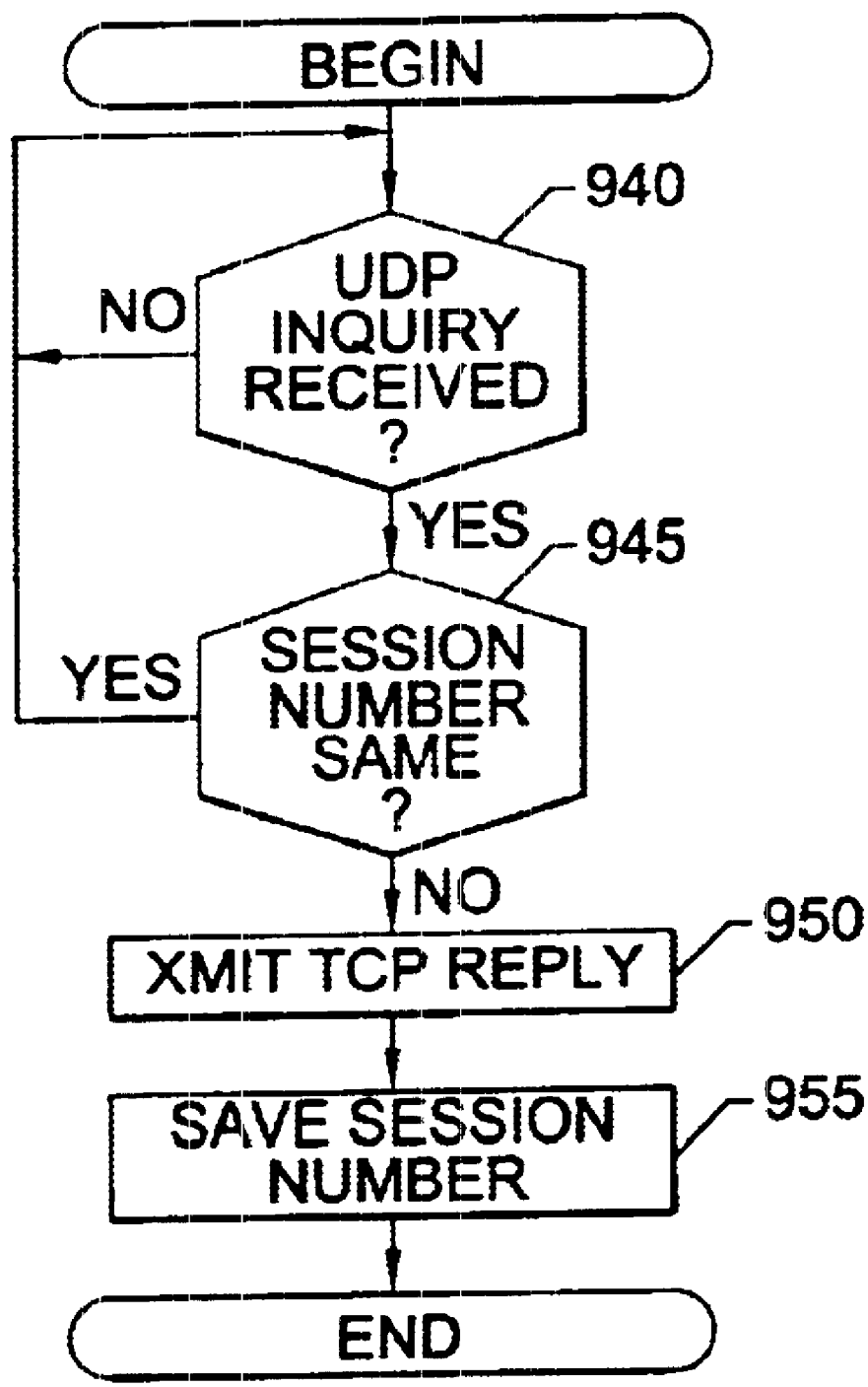

Referring now to FIGS. 9A–9C. A further embodiment of the autodiscovery aspect of the present invention will now be described. Operations will first be described with reference to FIG. 9A which illustrates operations by console node 20 executing endpoint autodiscovery operations. If endpoint autodiscovery operations are requested (block 900) a session number is assigned (block 905). The session number may be used as an identifier for a single execution of autodiscovery operations across a plurality of endpoint addresses for which UDP inquiries will be transmitted. The selection of endpoint addresses to be associated with a session may be provided, for example, by a user specified range of endpoint unique addresses, such as IP addresses. One or more ranges may be included for a single session. The requesting of autodiscovery may be based on a recurring scheduled basis or, for example, responsive to a user request. The user request could initiate an immediate autodiscovery or establish a time in the future for execution of the autodiscovery operations.

A UDP inquiry (or trigger) is transmitted (block 910). In the embodiment of FIG. 9, as multiple attempts may be desired a transmit counter is provided to establish the number of attempts transmission of UDP inquiries. Accordingly, if the transmit counter is not exceeded (block 915) operations at block 910 are repeated. Note that individual endpoint nodes may be listening on more than one IP address. Accordingly, the UDP inquiry may include an identification of the IP address the console node 20 used for the UDP inquiry. This identification may be useful under circumstances where the endpoint node would not otherwise be able to discriminate which of a plurality of IP addresses monitored by the endpoint node were associated with a specific UDP inquiry. The endpoint node may then respond in a manner which identifies the specific UDP inquiry to which it is responding. If additional addresses are to be tested during the session (block 917), the next address is selected (block 919) and operations repeat at blocks 910 through 917.

Referring now to FIG. 9B, operations related to a console node 20 processing an endpoint autodiscovery inquiry reply will now be further described. When a TCP reply is received from an endpoint in response to a UDP inquiry (block 920) the endpoint (EP) reply is read (block 925). If the endpoint identified from the read EP reply already exists (i.e., is already recognized and known to the console node 20) operations return to block 920 to await further replies (block 930). However, if the endpoint identified when the EP reply is read at block 925 did not previously exist (block 930) then the console node 20 determines that a new endpoint has been detected and takes appropriate actions, such as creating an endpoint object in a database of the console node 20 identifying the endpoint node and, thereby, making it known to the console node 20 (block 935).

Finally, with reference to FIG. 9C operations will be described with reference to an endpoint node processing a UDP inquiry. When a UDP inquiry is received by the endpoint (block 940), but the associated session number is still the same as one for which a previous UDP inquiry has been provided a reply (block 945) no further actions need be taken by the endpoint. However, if the session number is not the same (block 945) the endpoint transmits the appropriate TCP reply (block 950). As discussed above, the TCP reply preferably includes the address from the UDP inquiry. A session number may also be established at the endpoint node based on the session number established at block 905 of FIG. 9A (block 955). The session number may be provided to the endpoint node in the UDP inquiry. This session number tracking may be utilized to prevent an endpoint node from transmitting a TCP reply more than one time within a particular session for any one address associated with the endpoint node.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method for testing the performance of a communications network including a plurality of endpoint nodes comprising the steps of:

providing a console node residing on a computer to the network;

defining a plurality of active network test connections associated with the plurality of endpoint nodes, wherein each of the active network test connections is associated with a pair of the plurality of endpoint nodes and defines an endpoint node specific test protocol between the pair of the plurality of endpoint nodes to simulate communications traffic therebetween;

defining a test schedule for the active network test connections;

designating a passive network test selection for at least one of the endpoint nodes having an associated test schedule and an associated second endpoint node for execution of an associated active network test connection;

communicating the associated test schedule and the designated passive network test selection to the at least one of the endpoint nodes from the console node; and receiving network performance test results from at least one of the at least one of the endpoint nodes and the associated second endpoint node at the console node based on the defined test schedule and the designated passive network test selection.

2. A method according to claim 1 wherein the step of defining a connection comprises the step of defining a network communication test protocol based on a type of application communication traffic expected on the network.

3. A method according to claim 2 further comprising the following steps performed at the at least one of the pair of endpoint nodes:

receiving the associated test schedule and the designated passive network test selection;

activating passive monitoring of applications executing on the at least one of the endpoint nodes responsive to the passive network test selection if passive network testing is requested;

initiating active network testing based on the received test schedule; and reporting network performance test results to the console node based on the activated passive monitoring of applications and based on the initiated active network testing.

4. A method according to claim 3 further comprising the following step executed by the at least one of the endpoint nodes:

communicating a partner endpoint node test protocol based on the endpoint node specific test protocol to the associated second endpoint node.

5. A method according to claim 4 wherein the console node is an application executing on a single computer device coupled to the network.

6. A method according to claim 3 wherein the step of designating a passive network test selection further comprises the step of designating at least one application to be monitored and wherein the step of communicating the associated test schedule and the designated passive network test selection further comprises the step of communicating a port identification associated with the designated at least one application.

7. A method according to claim 6 further comprising the following step executed by the at least one of the endpoint nodes following the activating step:

passively monitoring at least one communication port of the at least one of the endpoint nodes, the at least one communication port being associated with the port identification, to obtain network performance test results associated with the designated at least one application.

8. A method according to claim 1 wherein the step of designating a passive network test selection further comprises the step of designating at least one application to be monitored and wherein the step of communicating the associated test schedule and the designated passive network test selection further comprises the step of communicating the designated at least one application.

9. A method according to claim 8 wherein the step of communicating the designated at least one application further comprises the step of communicating a port identification associated with the designated at least one application.

10. A method according to claim 9 wherein the step of communicating the designated at least one application further comprises the step of communicating an associated transaction model for use in obtaining network performance test results associated with the at least one application.

11. A method according to claim 10 wherein the associated transaction model is selected from the group consisting of client-delay, connect-disconnect and send-receive.

12. A method according to claim 8 wherein the step of communicating the designated at least one application further comprises the step of communicating an associated transaction model for use in obtaining network performance test results associated with the at least one application and wherein the step of passively monitoring further comprises the step of generating the network performance test results associated with the designated at least one application based on the associated transaction model.

13. A method according to claim 1 wherein the step of designating a passive network test selection is preceded by the steps of:

associating an application to be passively monitored with a transaction model selected from a plurality of candidate transaction models; and wherein the step of communicating the associated test schedule and the designated passive network test selection includes the step of communicating an identification of the application to be passively monitored and the associated transaction model to the at least one of the endpoint nodes.

14. A method according to claim 1 wherein the step of communicating the associated test schedule and the designated passive network test selection is preceded by the steps of:

transmitting an inquiry to detect the at least one of the endpoint nodes over the communications network to the at least one of the endpoint nodes from the console node using a User Datagram Protocol (UDP); and receiving a response to the inquiry over the communications network from the at least one of the endpoint nodes using a Transmission Control Protocol (TCP).

15. A method for testing the performance of a communications network including a plurality of endpoint nodes comprising the steps of:

providing a console node residing on a computer to the network;

defining an active network test connection associated with a pair of the endpoint nodes, the active network test connection defining an endpoint node specific test protocol between the pair of the endpoint nodes;

defining a test schedule for the active network test connection;

designating a passive network test selection for at least one of the pair of the endpoint nodes;

communicating the test schedule, including the endpoint node specific test protocol, and the designated passive network test selection to the at least one of the pair of the endpoint nodes from the console node;

communicating a partner endpoint node test protocol based on the endpoint node specific test protocol from the at least one of the pair of the endpoint nodes to the other of the pair of the endpoint nodes; and receiving network performance test results from the pair of the endpoint nodes at the console node based on the test schedule and the designated passive network test selection.

16. A method according to claim 15 further comprising the steps of:

receiving the test schedule and the designated passive network test selection;

activating passive monitoring of applications executing on the at least one of the pair of the endpoint nodes responsive to the passive network test selection if passive network testing is requested;

initiating active network testing based on the received test schedule; and reporting network performance test results to the console node based on the activated passive monitoring of applications and based on the initiated active network testing.

17. A method according to claim 16 wherein the step of designating a passive network test selection further comprises the step of designating at least one application to be monitored and wherein the step of communicating the test schedule and the designated passive network test selection further comprises the step of communicating a port identification associated with the designated at least one application.

18. A method according to claim 17 further comprising the following step executed by the at least one of the endpoint nodes following the activating step:

passively monitoring at least one communication port of the at least one of the endpoint nodes, the at least one communication port being associated with the port identification, to obtain network performance test results associated with the designated at least one application.

19. A method according to claim 18 wherein the step of communicating the designated at least one application further comprises the step of communicating an associated transaction model for use in obtaining network performance test results associated with the at least one application and wherein the step of passively monitoring further comprises the step of generating the network performance test results associated with the designated at least one application based on the associated transaction model.

20. A method according to claim 15 wherein the step of designating a passive network test selection further comprises the step of designating at least one application to be monitored and wherein the step of communicating the test schedule and the designated passive network test selection further comprises the step of communicating the designated at least one application.

21. A method according to claim 20 wherein the step of communicating the designated at least one application further comprises the step of communicating a port identification associated with the designated at least one application.

22. A method according to claim 21 wherein the step of communicating the designated at least one application further comprises the step of communicating an associated transaction model for use in obtaining network performance test results associated with the at least one application.

23. A method according to claim 22 wherein the associated transaction model is selected from the group consisting of client-delay, connect-disconnect and send-receive.

24. A method for monitoring the performance of applications communicating over a communications network comprising the steps of:

providing a passive network test selection specifying a plurality of applications to be monitored;

determining port identifications associated with the plurality of applications designated to be monitored based on the passive network test selection;

associating each of the plurality of applications with a transaction model selected from a plurality of candidate transaction models; and obtaining network performance test results for the plurality of applications based on their respective transaction models and monitoring of communication ports associated with the determined port identifications.

25. A method according to claim 24 wherein the candidate transaction models include client-delay, connect-disconnect and send-receive.

26. A method for discovery of endpoint nodes on a communications network comprising the steps of:

transmitting inquiries over the communications network to a plurality of candidate endpoint nodes using a User Datagram Protocol (UDP); and receiving responses to the inquiries over the communications network using a Transmission Control Protocol (TCP);

wherein each of the inquiries is associated with a discovery session number, the discovery session number is utilized to prevent an endpoint node from transmitting a TCP response more than one time within a particular session for any one address associated with the endpoint node.

27. A method according to claim 26 wherein the transmitting step is executed responsive to a user request.

28. A system for testing the performance of a communications network including a plurality of endpoint nodes comprising:

a console node residing on a computer coupled to the communications network;

means for defining a plurality of active network test connections associated with the plurality of endpoint nodes, wherein each of the active network test connections is associated with a pair of the plurality of endpoint nodes and defines an endpoint node specific test protocol between the pair of the plurality of endpoint nodes to simulate communications traffic therebetween;

means for defining a test schedule for the active network test connections;

means for designating a passive network test selection for at least one of the endpoint nodes having an associated test schedule and an associated second endpoint node for execution of an associated active network test connection;

means for communicating the associated test schedule and the designated passive network test selection to the at least one of the endpoint nodes from the console node; and means for receiving network performance test results from at least one of the at least one of the endpoint nodes and the associated second endpoint node at the console node based on the defined test schedule and the designated passive network test selection.

29. A system for testing the performance of a communications network including a plurality of endpoint nodes comprising:

a console node residing on a computer coupled to the communications network;

an active network test module that defines a plurality of active network test connections associated with the plurality of endpoint nodes, wherein each of the active network test connections is associated with a pair of the plurality of endpoint nodes and defines an endpoint node specific test protocol between the pair of the plurality of endpoint nodes to simulate communications traffic therebetween and defines a test schedule for the active network test connections;

a passive network test module that designates a passive network test selection for at least one of the endpoint nodes having an associated test schedule and an associated second endpoint node for execution of an associated active network test connection; and an interface coupled to the communications network configured to communicate the associated test schedule and the designated passive network test selection to the at least one of the endpoint nodes from the console node and receives network performance test results from at least one of the at least one of the endpoint nodes and the associated second endpoint node at the console node based on the defined test schedule and the designated passive network test selection.

30. A system for testing the performance of a communications network including a plurality of endpoint nodes comprising:

a console node residing on a computer coupled to the network;

means for defining an active network test connection associated with a pair of the endpoint nodes, the active network test connection defining an endpoint node specific test protocol between the pair of the endpoint nodes;

means for defining a test schedule for the active network test connection;

means for designating a passive network test selection for at least one of the pair of the endpoint nodes;

means for communicating the test schedule, including the endpoint node specific test protocol, and the designated passive network test selection to the at least one of the pair of the endpoint nodes from the console node;

means for communicating a partner endpoint node test protocol based on the endpoint node specific test protocol from the at least one of the pair of the endpoint nodes to the other of the pair of the endpoint nodes; and means for receiving network performance test results from the pair of the endpoint nodes at the console node based on the test schedule and the designated passive network test selection.

31. A system for monitoring the performance of applications communicating over a communications network comprising:

means for providing a passive network test selection specifying a plurality of applications to be monitored;

means for determining port identifications associated with the plurality of applications designated to be monitored based on the passive network test selection;

means for associating each of the plurality of applications with a transaction model selected from a plurality of candidate transaction models; and means for obtaining network performance test results for the plurality of applications based on their respective transaction models and monitoring of communication ports associated with the determined port identifications.

32. A system for discovery of endpoint nodes on a communications network comprising:

a transmitter that transmits inquiries over the communications network to a plurality of candidate endpoint nodes using a User Datagram Protocol (UDP);

a controller that initiates transmission of the inquiries; and a receiver that receives responses to the inquiries over the communications network using a Transmission Control Protocol (TCP);

wherein each of the inquiries is associated with a discovery session number, the discovery session number is utilized to prevent an endpoint node from transmitting a TCP response more than one time within a particular session for any one address associated with the endpoint node.

33. A computer program product for testing the performance of a communications network including a plurality of endpoint nodes, comprising:

a computer readable storage medium having computer readable program code embodied in said medium, said computer-readable program code comprising:

computer-readable program code that defines a plurality of active network test connections associated with the plurality of endpoint nodes, wherein each of the active network test connections is associated with a pair of the plurality of endpoint nodes and defines an endpoint node specific test protocol between the pair of the plurality of endpoint nodes to simulate communications traffic therebetween;

computer-readable program code that defines a test schedule for the active network test connections;

computer-readable program code that designates a passive network test selection for at least one of the endpoint nodes having an associated test schedule and an associated second endpoint node for execution of an associated active network test connection;

computer-readable program code that communicates the associated test schedule and the designated passive network test selection to the at least one of the endpoint nodes from a console node; and computer-readable program code that receives network performance test results from at least one of the at least one of the endpoint nodes and the associated second endpoint node at the console node based on the defined test schedule and the designated passive network test selection.

34. A computer program product for testing the performance of a communications network including a plurality of endpoint nodes, comprising:

a computer readable storage medium having computer readable program code embodied in said medium, said computer-readable program code comprising:

computer-readable program code that defines an active network test connection associated with a pair of the endpoint nodes, the active network test connection defining an endpoint node specific test protocol between the pair of the endpoint nodes;

computer-readable program code that defines a test schedule for the active network test connection;

computer-readable program code that designates a passive network test selection for at least one of the pair of the endpoint nodes;

computer-readable program code that communicates the test schedule, including the endpoint node specific test protocol, and the designated passive network test selection to the at least one of the pair of the endpoint nodes from a console node;

computer-readable program code that communicates a partner endpoint node test protocol based on the endpoint node specific test protocol from the at least one of the pair of the endpoint nodes to the other of the pair of the endpoint nodes; and computer-readable program code that receives network performance test results from the pair of the endpoint nodes at the console node based on the test schedule and the designated passive network test selection.

35. A computer program product for monitoring the performance of applications communicating over a communications network comprising:

a computer-readable program code that provides a passive network test selection specifying a plurality of applications to be monitored;

a computer-readable program code that determines port identifications associated with the plurality of applications designated to be monitored based on the passive network test selection;

a computer-readable program code that associates each of the plurality of applications with a transaction model selected from a plurality of candidate transaction models; and a computer-readable program code that obtains network performance test results for the plurality of applications based on their respective transaction models and monitoring of communication ports associated with the determined port identifications.

36. A computer program product for discovery of endpoint nodes on a communications network, comprising:

a computer readable storage medium having a computer readable program code embodied in said medium, said computer-readable program code comprising:

computer-readable program code that transmits inquiries over the communications network to a plurality of candidate endpoint nodes using a User Datagram Protocol (UDP);

a computer-readable program code that initiates transmission of the inquiries; and a computer-readable program code that receives responses to the inquiries over the communications network using a Transmission Control Protocol (TCP);

wherein each of the inquiries is associated with a discovery session number, the discovery session number is utilized to prevent an endpoint node from transmitting a TCP response more than one time within a particular session for any one address associated with the endpoint node.

* * * * *